(12) United States Patent
Prabhakar et al.

(10) Patent No.: US 10,812,712 B2
(45) Date of Patent: Oct. 20, 2020

(54) SYSTEMS AND METHODS FOR VEHICLE CAMERA VIEW ACTIVATION

(71) Applicant: Toyota Motor Engineering & Manufacturing North America, Inc., Plano, TX (US)

(72) Inventors: Varun J. Prabhakar, Saline, MI (US); Paxton S. Williams, Milan, MI (US)

(*) Notice: Subject to any disclaimer, the term of this patent is extended or adjusted under 35 U.S.C. 154(b) by 142 days.

(21) Appl. No.: 15/960,528

(22) Filed: Apr. 23, 2018

(65) Prior Publication Data
US 2019/0327415 A1 Oct. 24, 2019

(51) Int. Cl.
*B60R 1/00* (2006.01)
*B60R 11/04* (2006.01)
*H04N 5/232* (2006.01)
*B60R 11/00* (2006.01)

(52) U.S. Cl.
CPC ......... *H04N 5/23245* (2013.01); *B60R 1/002* (2013.01); *B60R 11/04* (2013.01); *B60R 2011/004* (2013.01); *B60R 2300/105* (2013.01); *B60R 2300/20* (2013.01)

(58) Field of Classification Search
CPC ..... H04N 5/23245; B60R 1/002; B60R 11/04; B60R 2300/20; B60R 2011/004; B60R 2300/105
USPC ....................................................... 348/148
See application file for complete search history.

(56) References Cited

U.S. PATENT DOCUMENTS

| | | | |
|---|---|---|---|
| 6,593,960 B1 * | 7/2003 | Sugimoto | B60R 11/04 348/142 |
| 8,294,563 B2 * | 10/2012 | Shimoda | B60R 1/00 340/425.5 |
| 8,564,662 B2 * | 10/2013 | Busch | B60R 1/00 348/148 |
| 9,008,369 B2 | 4/2015 | Schofield | |
| 9,085,261 B2 | 7/2015 | Lu | |
| 2010/0238051 A1 | 9/2010 | Suzuki | |
| 2012/0158243 A1 * | 6/2012 | Pupin | B62D 15/0295 701/36 |
| 2013/0107045 A1 * | 5/2013 | Soderlind | B60R 1/04 348/148 |
| 2015/0166059 A1 | 6/2015 | Ko | |
| 2016/0101734 A1 * | 4/2016 | Baek | B60R 1/00 348/148 |
| 2016/0119509 A1 | 4/2016 | Wato | |
| 2016/0196823 A1 * | 7/2016 | Yellambalase | G10L 15/22 348/148 |
| 2017/0313248 A1 * | 11/2017 | Kothari | B60K 35/00 |

\* cited by examiner

*Primary Examiner* — Susan E. Hodges
(74) *Attorney, Agent, or Firm* — Sheppard, Mullin, Richter & Hampton LLP; Hector A. Agdeppa; Daniel N. Yannuzzi

(57) ABSTRACT

Systems and methods may include a camera mode circuit receiving input from a plurality of sensors, determining camera modes available for camera activation, selecting one of the available camera modes by using received input from the plurality of sensors, evaluating input received from the plurality of sensors to determine the current condition of the vehicle and selecting a camera mode based on the determine current condition of the vehicle, selecting one or more cameras from which images are to be displayed based on the selected camera mode and mapping images from the selected cameras to one or more displays within the vehicle, and displaying the images from the selected cameras according to the mapping in response to an activation event.

20 Claims, 14 Drawing Sheets

SYSTEMS AND METHODS FOR VEHICLE CAMERA VIEW ACTIVATION

TECHNICAL FIELD

The disclosed technology relates generally to cameras and camera activation systems for a vehicle, and more particularly, some embodiments relate to a camera activation system responsive to driver input, vehicle conditions and conditions external to the vehicle.

DESCRIPTION OF THE RELATED ART

Motor vehicle camera systems are employed to capture images of one or more areas around the exterior of the vehicle, such as to the front, rear or sides of the vehicle. The captured images e.g., in the form of video) may be displayed to the driver to facilitate parking, backing up, or other operation of the motor vehicle. The captured images can be displayed on a multimedia display screen, head unit display, dedicated display screen or other display device. A physical button on the dashboard or center console of the vehicle, or somewhere within reach of the driver, allows the driver or other person in the interior of the vehicle to activate the camera system and control the views. Activation and control of the views may also be provided with a virtual button on an area on the touch screen display of a multimedia head unit, or with a selectable option within a menu in a display such as instrument panel, dashboard or center-stack display, or multimedia system.

BRIEF SUMMARY OF EMBODIMENTS

Embodiments of the technology disclosed herein are directed toward systems and methods for activating one or more cameras which are a part of a vehicle camera system.

One example method operates a vehicular camera and display system that may include a plurality of cameras to capture images to at least one of the front, rear and sides of a host vehicle and one or more displays on which to display captured images. In one embodiment, the method may include: a camera mode circuit receiving input from a plurality of sensors, the camera mode circuit determining one or more camera modes available to a camera activation, the camera mode circuit selecting a camera mode of the one or more camera modes available to the camera activation system using the input received from the plurality of sensors, the camera mode circuit selecting one or more cameras from which images are to be displayed based on the selected camera mode and mapping the selected one or more cameras to one or more of the vehicle displays, and displaying images from the one or more cameras on the one or more vehicle display in accordance with the mapping.

In one embodiment of the method for operation of vehicular camera and display system, the operation of selecting a camera mode may include the camera mode circuit evaluating input received from the plurality of sensors to determine current conditions under which the vehicle is operating, and selecting a camera mode of the plurality of camera modes that is appropriate for the determined current conditions.

In various embodiments, the camera mode circuit displays the images in response to an activation event. In further examples, the activation event may include a user activating the vehicular camera and display system by actuating an actuator or using a voice command. In yet further examples, the activation event may include the camera mode circuit automatically creating an activation event based on input received from the plurality of sensors.

In various applications, at least one of the one or more cameras may be mounted to a trailer being towed by the host vehicle. Accordingly, one of the one or more camera modes may include a tow mode. The camera mode circuit may be configured to select a tow mode when it determines based on information from one or more of the sensors that a trailer is attached to the vehicle. In some embodiments, the example method may further include selecting one or more cameras from which images are to be displayed based on the selected camera mode. When the tow mode is the selected mode this may include selecting one or more cameras mounted to the trailer being towed by the host vehicle for display on one or more of the displays.

One of the one or more camera modes may include a terrain mode, and the camera mode circuit may select a terrain mode when it determines based on information from one or more of the sensors that the host vehicle is operating in rough terrain. In a further example, selecting one or more cameras from which images are to be displayed based on the selected camera mode may include selecting one or more side-view cameras for display on one or more of the displays when the terrain mode is the selected mode. In another example, when the terrain mode is the selected mode, selecting one or more cameras from which images are to be displayed based on the selected camera mode may include selecting a side-view camera, a front-view camera and a rear-view camera for display. This example may further include displaying images from the side-view camera the front-view camera in the rear-view camera simultaneously on one or more of the displays.

In some example methods, the actuator may include a button or switch and the user actuating the actuator may include the user pressing the button or operating the switch for a predetermined period of time. In one example, the predetermined period of time may be dependent upon a vehicle condition. For example, the vehicle condition may include a then-current speed of the vehicle. In another example, the vehicle condition may include a then-current or projected weather forecast according to a geolocation of the vehicle. In one embodiment, the actuator may include a button or switch and displaying images from the one or more cameras on the one or more vehicle display in accordance with the mapping may include displaying the images for as long as a vehicle operator maintains the button or switch in an actuated state.

In one example method, selecting one or more cameras from which images are to be displayed based on the selected camera mode is accomplished according to an entered preference of a vehicle user.

In some embodiments, a vehicle occupant actuating the actuator overrides a previous camera mode displayed on the selected vehicle display.

In another embodiment, an example vehicular camera and display system, may include: a plurality of cameras to capture images to at least one of the front, rear and sides of a host vehicle, a plurality of displays mounted to be visible to occupants of the vehicle on which to display captured images to occupants of the vehicle, a plurality of sensors to capture conditions of the host vehicle and its surroundings, and a camera mode circuit.

In one example, the camera mode circuit may include a communications receiver to receive input from the plurality of sensors and a mode circuit including an input to receive information from the communications receiver, wherein the mode circuit selects a camera mode of one or more camera modes available to the camera activation system using the input received from the plurality of sensors, and the camera mode circuit selects one or more cameras from which images are to be displayed based on the selected camera mode and maps the selected one or more cameras to one or more of the vehicle displays.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
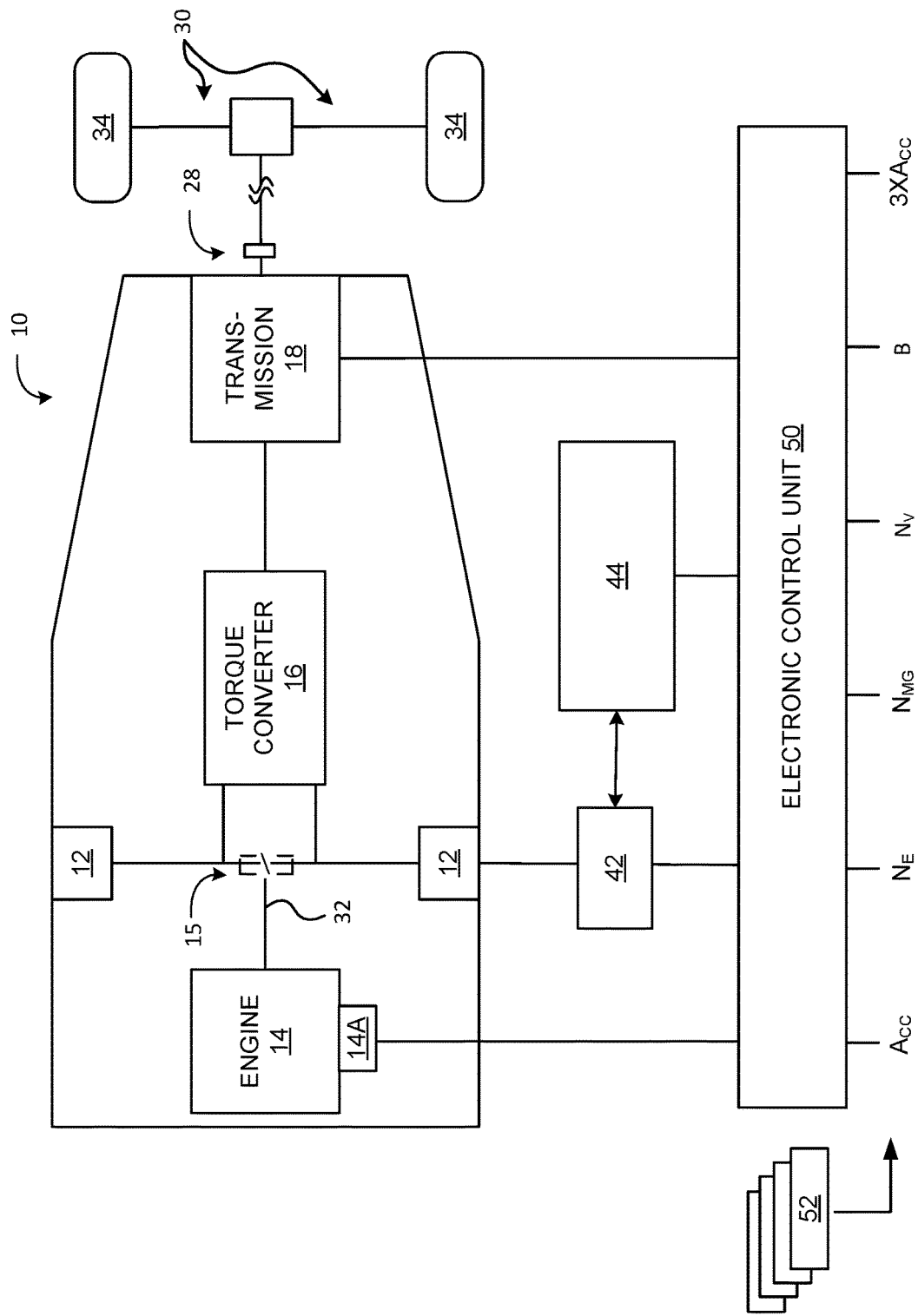
FIG. 1 illustrates an example of a vehicle with which systems and methods for a camera vehicle activation system is implemented in accordance with one embodiment of the systems and methods described herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed towards systems and methods for a camera activation system responsive to one or more inputs including driver or other user input, vehicle conditions and conditions external to the vehicle. The camera activation system may be configured to monitor a variety of conditions including, for example, the current state of the vehicle, the current and forecasted surroundings of the vehicle and conditions external to the vehicle. Current state of the vehicle may include parameters such as, for example, current vehicle speed, a current gear in which the vehicle is operating (e.g., reverse, drive, etc.); a vehicle operating mode (e.g., sport mode, hill descent mode, tow mode, etc.); vehicle attitude (e.g., angle of roll, pitch and yaw of the vehicle), geolocation, etc. Current and forecasted surroundings of the vehicle may include the current and projected weather conditions, terrain conditions, operating environment (e.g., freeway, parking lot, surface streets, etc.), and traffic conditions. These surroundings may be determined using the information such as, for example, the location of the vehicle, the projected travel path of the vehicle, input from cameras and other sensors, and user input.

One or more camera modes may be made available to the driver when criteria for camera modes are satisfied. Example modes may include a snow or slick-surface driving mode, a parking mode, a trailer maneuvering mode, a rough-terrain mode, a city mode, a freeway mode, autonomous and semi-autonomous driving modes, a cruise control mode, and so on. In some embodiments, the various modes can be activated by user input. For example, the driver or other user may activate a desired mode by operating a physical or virtual switch, button, or other actuation device or by voice command. In other embodiments the various modes may be automatically activated based on internal or external conditions detected by the camera activation system. For example, when the vehicle operator places the vehicle in reverse in the system determines that a trailer is attached to the vehicle, a trailer backup mode may automatically be activated. As another example, the camera activation system may determine based on geolocation information and driving mode that the vehicle is maneuvering through rough terrain, and may activate an off-road a camera mode in response.

In still further embodiments, the camera activation system may suggest one or more operating modes to the user so that the user may select a particular mode if desired. The camera activation system may also be configured to remap physical or virtual switches or other actuators such that these actuators are reprogrammed to activate a camera mode appropriate for detected conditions.

In some embodiments, a time-delay trigger may be implemented in the camera activation system to lessen the risk of accidental activation. In some embodiments, this may be implemented as a time delay for activating the system, whereas in other embodiments it may be implemented to provide the user the opportunity to confirm that he or she wishes to enter a particular mode. As one example, the time-delay trigger may be implemented as a press-and-hold feature requiring that the user maintain pressure on the actuator for a predetermined period of time (e.g. 1 or 2 seconds or other time period) before the camera mode is activated. The time delay trigger may be a dynamic time delay trigger that changes the amount of delay based on conditions such as, for example, vehicle speed or other detected conditions. For example, when the camera activation system detects that the vehicle is travelling at a high rate of speed, the time delay trigger may be shortened, because the driver has less time to respond when traveling at high rates of speed. Other conditions may affect the time delay trigger of the camera activation system such as for example where the camera activation system detects conditions that correspond to the camera mode selected, thereby confirming the user's selection. For example, when it is raining or snowing in the area where the vehicle is travelling and the operator selects a snow mode, a shorter time delay trigger may be used (or the delay may be eliminated altogether) because the selected mode corresponds to the detected conditions.

Images or video captured from the one or more cameras of the camera activation system, such as one or more forward-facing camera(s) (e.g., mounted at front of the vehicle or behind the windshield and facing forward), side facing camera(s) (e.g., mounted on the side mirrors, fenders, body skirts, or other locations on the vehicle and facing to the side) and rear-facing camera(s) are displayed in one or more displays located in the interior of the vehicle. As noted above, the camera activation system may include pre-programmed camera modes that can be used. These may include, for example, a snow mode, a terrain mode, a tow mode, a freeway mode, a parking mode, and so on. Depending on the mode activated, one or more cameras may be selected that are appropriate to that mode and the images from the one or more cameras displayed on one or more displays or via a split screen display to the vehicle operator. In some applications, the vehicle operator, or other user, may program the camera modes to display the captured images on one or more multimedia displays in the vehicle and override the vehicle manufacturer settings. For example, the user can be given the ability to program custom preferences for the snow camera mode, when activated by the press of the physical or virtual button, to display the camera view from a forward-facing camera on the inner mirror display.

The technology disclosed herein may be implemented with any of a number of different vehicle types including, for example, automobiles, trucks, buses, boats and ships, and other vehicles. An example vehicle, such as a hybrid electric vehicle (HEV), in which a camera vehicle activation system may be implemented is illustrated in FIG. 1. FIG. 1 illustrates an example of a hybrid electric vehicle 10 that may include an internal combustion engine 14 and one or more electric motors 12 as sources of motive power. Driving force generated by the internal combustion engine 14 and motor 12 can be transmitted to one or more wheels 34 via a torque converter 16, a transmission 18, a differential gear device 28, and a pair of axles 30.

As an HEV, vehicle 10 may be driven/powered with either or both of engine 14 and the motor(s) 12 as the drive source for travel. For example, a first travel mode may be an engine-only travel mode that only uses ICE 14 as the drive source for travel. A second travel mode may be an EV travel mode that only uses the motor(s) 12 as the drive source for travel. A third travel mode may be an HEV travel mode that uses engine 14 and the motor(s) 12 as drive sources for travel. In the engine-only and HEV travel modes, vehicle 10 relies on the motive force generated at least by ICE 14, and a clutch 15 may be included to engage engine 14. In the EV travel mode, vehicle 10 is powered by the motive force generated by motor 12 while engine 14 may be stopped and clutch 15 disengaged.

Engine 14 can be an internal combustion engine such as a gasoline, diesel or similarly powered engine in which fuel is injected into and combusted in a combustion chamber. An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 12 can also be used to provide motive power in vehicle 10, and is powered electrically via a power storage device 44. Motor 12 can be powered by power storage device 44 to generate a motive force to move the vehicle and adjust vehicle speed. Motor 12 can also function as a generator to generate electrical power such as, for example, when coasting or braking. Power storage device 44 may also be used to power other electrical or electronic systems in the vehicle. Motor 12 may be connected to power storage device 44 via an inverter 42. Power storage device 44 can include, for example, one or more batteries, capacitive storage units, or other storage reservoirs suitable for storing electrical energy that can be used to power one or more motors 12. When power storage device 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motors and adjust the current received from motors 12 during regenerative coasting and breaking. As a more particular example, output torque of the motor 12 can be increased or decreased by electronic control unit 50 through the inverter 42.

A torque converter 16 can be included to control the application of power from engine 14 and motors 12 to transmission 18. Torque converter 16 can include a viscous fluid coupling that transfers rotational power from the motive power source to the driveshaft via the transmission 18. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motors 12 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 10 may include an electronic control unit 50. Electronic control unit 50 may include circuitry to control various aspects of the vehicle operation. Electronic control unit 50 may include, for example, a microcomputer that includes one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 10. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of ICE 14 (engine RPM), a rotational speed, $N_{MG}$, of the motor 12 (motor rotational speed), and vehicle speed, $N_V$. These may also include torque converter 16 output, $N_T$ (e.g., output amps indicative of motor output), brake operation amount, B, battery SOC (i.e., the charged amount for power storage device 44 detected by an SOC sensor). Accordingly, vehicle 10 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (ICE 14+motor 12) efficiency, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensor 52 may provide an analog output or a digital output.

Additional sensors 52 may be included to detect vehicle conditions as well as to detect external conditions. Sensors that might be used to detect external conditions can include, for example, sonar, radar, lidar or other vehicle proximity sensors, and cameras or other image sensors. Cameras, or image capture devices can be used to detect, for example, road conditions in the region in front and all around the vehicle and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Figure 2:
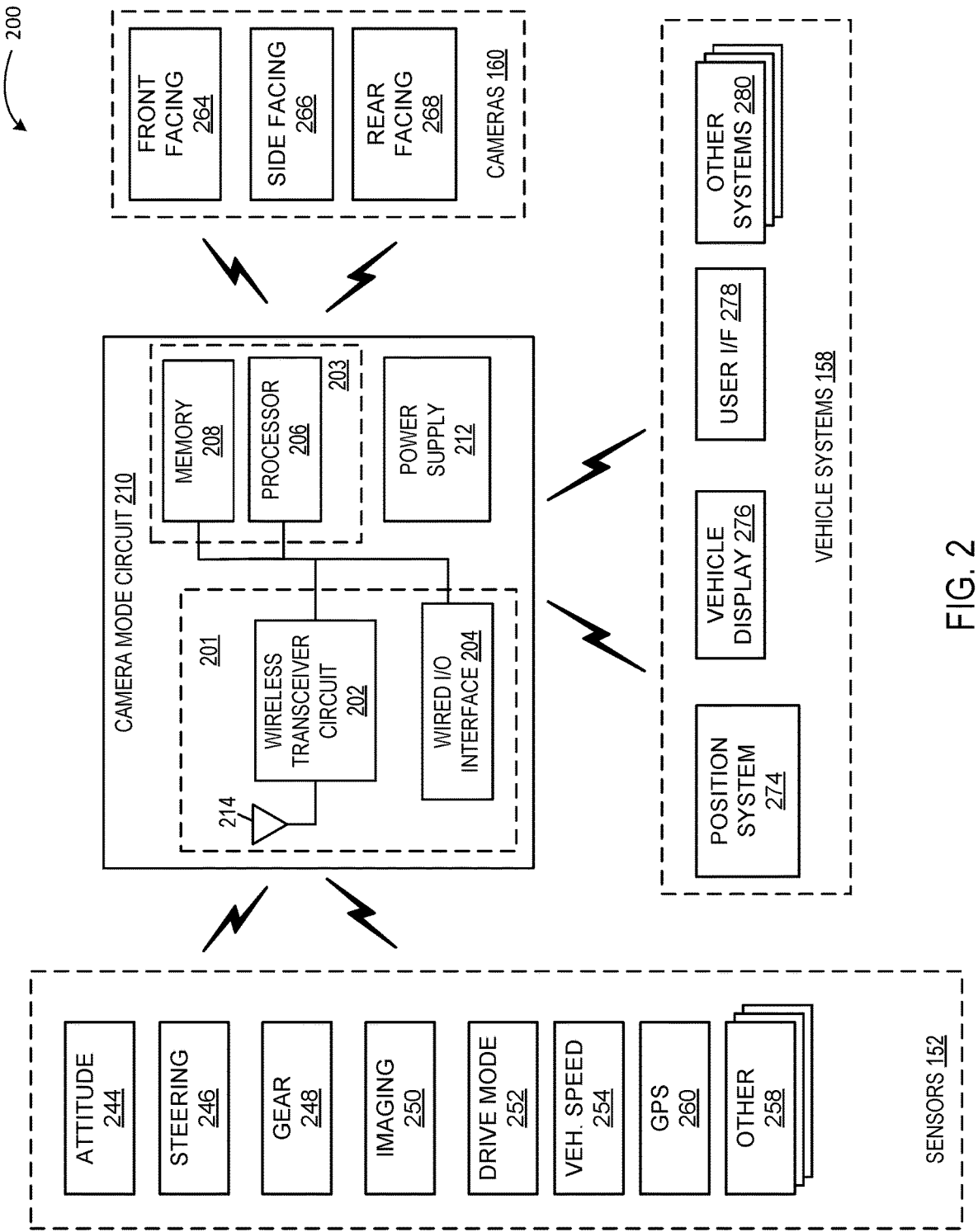
FIG. 2 illustrates an example architecture for vehicle camera activation system in accordance with one embodiment described herein.

FIG. 2 is a diagram illustrating an example of a camera and display system in accordance with one embodiment of the systems and methods described herein. Referring now to FIG. 2, in this example, vehicular camera and display system 200 includes a camera mode circuit 210, a plurality of sensors 152, a plurality of vehicle systems 158 and a plurality of cameras 160. Sensors 152, vehicle systems 158 and cameras 160 can communicate with camera mode circuit 210 via a wired or wireless communication interface. Although sensors 152, vehicle systems 158 and cameras 160 are depicted as communicating with camera mode circuit 210, they can also communication with each other as well as with other vehicle systems. Camera mode circuit 210 can be implemented as an ECU or as part of an ECU such as, for example, electronic control unit 50 in the example vehicle of FIG. 1, or it may be implemented as a standalone circular circuits.

Camera mode circuit 210 in this example includes a communication circuit 201, a mode circuit 203 (including a processor 206 and memory 208 in this example) and a power supply 212. Components of camera mode circuit 210 are illustrated as communicating with each other via a data bus, although other communication interfaces can be included. Processor 206 can include a GPU, CPU, microprocessor, or any other suitable processing system. The memory 208 may include one or more various forms of memory or data storage (e.g., flash, RAM, etc.) that may be used to store calibration parameters, images (analysis or historic), point parameters, instructions and variables for processor 206 as well as any other suitable information. Memory 208 can be made up of one or more modules of one or more different types of memory, and may be configured to store data and other information as well as operational instructions that may be used by the processor 206 to camera mode circuit 210. In some embodiments, memory 208 stores criteria which needs to be satisfied before a particular camera mode is made available to the user. In some embodiments, memory 208 stores custom preferences for camera modes inputted by the user.

Although the example of FIG. 2 is illustrated using processor and memory circuitry, as described below with reference to circuits disclosed herein, mode circuit 203 can be implemented utilizing any form of circuitry including, for example, hardware, software or a combination thereof. By way of further example, one or more processors, controllers, ASICs, PLAs, PALs, CPLDs, FPGAs, logic components, software routines or other mechanisms might be implemented to make up a camera mode circuit 210.

Communication circuit 201 may include either or both a wireless transceiver circuit 202 with an associated antenna 214 and a wired I/O interface 204 with an associated hardwire data port (not illustrated). As this example illustrates, communications with camera mode circuit 210 can include either or both wired and wireless communications. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by camera mode circuit 210 to/from other entities such as sensors 152 and vehicle systems 158.

Wired I/O interface 204 can include a transmitter and a receiver (not shown) for hardwired communication with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Communication circuit 201 can be used to transmit and receive information between camera mode circuit 210 and sensors 152, and camera mode circuit 210 and vehicle systems 158. For example, communication circuit 201 can be configured to receive data and other information from sensors 152 in determining whether criteria of one or more camera modes have been satisfied. Additionally, communication circuit 201 can be used to send an activation signal or other activation information to vehicle displays 276 to display the images and video captured by the one or more cameras of imaging system 250. Furthermore, communication circuit 201 can be used to send location request or receive geolocation information from GPS sensor 260. Information from GPS sensor 260 may be used by camera mode circuit 210 to determine the current path of travel and/or the projected path of travel to determine if the criteria of one or more camera modes has is currently satisfied or will be satisfied. In some embodiments, communication circuit 201 can be used to receive current or projected weather forecast to determine the time-delay trigger for the camera activation system or determine if the criteria of one or more camera modes is currently satisfied or will be satisfied.

Power supply 212 can include one or more of a battery or batteries (such as e.g., Li-ion, Li-Polymer, NiMH, NiCd, NiZn, NiH$_2$, rechargeable primary battery, etc.), a power connector (e.g., to connect to vehicle supplied power, etc.), an energy harvester (e.g., solar, cells, piezoelectric system, etc.), or include any other suitable power supply. In some applications, camera mode circuit 210 may receive power from the vehicle in which it is installed, such as, for example, from a vehicle batter or alternator circuit, or it may otherwise receive power from external sources. In such applications, power supply 212 may be for backup purposes or power supply 212 may be omitted from the circuit. Power supply 212 may also be implemented as a power conditioner to properly condition power for camera mode circuit 210.

Sensors 152 can include, for example, sensors 52 such as those described above with reference to the example of FIG. 1. Sensors 52 can include additional sensors that may or may not otherwise be included on a standard vehicle 10 with which the vehicular camera and display system 200 is implemented. In the illustrated example, sensors 152 include, attitude sensor 244, steering input sensor 246, engaged-gear sensor 248, imaging system 250 (e.g., one or more cameras), drive-mode sensor 252 and vehicle speed sensor 254. Other additional sensors 258 can also be included as may be appropriate for a given implementation of vehicular camera and display system 200.

Attitude sensor 244 can include, for example, one or more accelerometers (e.g., single-, two- or three-axis accelerometers) to indicate a vehicle event such as a roll pitch or yaw event. For example, yaw events can be monitored to detect the host vehicle turning, swerving or otherwise changing direction. Likewise, pitch and roll events can be monitored to detect whether the vehicle is climbing, the sending or traversing steep terrain. Accelerometers can also be used to indicate acceleration/deceleration in a number of different axes and can provide this information to camera mode circuit 210. Input from attitude sensor 244 may be used to determine if the criteria of certain modes are currently satisfied. For example, attitude events coupled with vehicle location information can use to determine whether a multi-terrain mode is appropriate. An example of a multi-terrain camera mode is described in further detail with respect to FIG. 10. As another example, an attitude event indicating that the driver is rocking the vehicle back and forth may indicate that the vehicle is stuck in snow or mud and may activate an appropriate camera mode to provide appropriate views to the driver. As yet another example, a change in direction (e.g., forward to reverse) coupled with location information and the presence of a trailer hooked to the vehicle may indicate that the driver is backing the trailer into a parking spot or down a boat ramp and this may trigger an appropriate trailer mode.

Steering sensor 246 can be used to provide date indicating a direction and an amount of steering input made by a driver operating the host vehicle. For example, rotary encoders can be included (e.g., at the steering column) to indicate steering wheel angle and rate of change and direction of change of the steering wheel angle. Torque sensors, servo systems, accelerometers, and other like sensors can also be used to detect steering events for the host vehicle steering system. In electronic drive-by-wire steering systems, data from the steering control system itself can be used. In some embodiments, the steering wheel angle, and rate of change and direction of change of the steering wheel angle is used to determine if the field of view (FOV) of one or more camera modes needs to be changed. For example, if the steering sensor 246 sends data to camera mode circuit 210 of the rate of change and direction of change of the steering wheel angle that the vehicle is taking a sharp right turn, the driver will be given a better view of any potential blind spots while taking the sharp right turn by changing the FOV of the camera mounted on the exterior right side mirror. Steering input may also indicate the direction in which a driver is backing into a parking spot. Again, the system may select cameras for display accordingly.

Engaged-gear sensor 248 can be used to detect the gear in which the vehicle is placed by the driver. For example, engaged-gear sensor 248 can detect whether the vehicle is in a forward or a reverse gear and, in some embodiments, which of several forward gears is engaged at the time.

Imaging system 250 can also be included to provide image sensor type of information to camera mode circuit 210. Imaging system 250 can include one or more image detectors to detect upcoming road characteristics. For example, optical or infrared image sensors coupled with image detection circuitry can detect road signs, upcoming curves in the roadway, obstacles in the path of the vehicle, or the presence of rain, snow or fog activity. For example, using this information, along with the current weather forecast or projected weather forecast and geolocation of the vehicle, camera mode circuit 210 can determine if the criteria for snow camera mode is currently satisfied.

Drive mode sensor 252 can be used to detect a drive mode of the vehicle. For example, drive mode sensor 252 can detect whether user may have placed the vehicle into a mode (or whether the vehicle automatically switched to a mode) such as a hill-descent or creep mode, a snow or winter mode (e.g., lowering the amount of torque applied to the wheels), a sand or terrain mode, a sport mode, economy mode, cruise control mode, autonomous or semi-autonomous driving mode, and so on. This mode information can be passed on to camera mode circuit 210 and used to detect a mode for operation.

Vehicular speed sensor 254 can be included to detect the speed at which the vehicle is traveling, and share this information with camera mode circuit 210. Vehicular speed sensor 254 can be implemented, for example, as the vehicle's speedometer. Speed information may also be obtained through the vehicle's GPS or other like positioning system. In some applications, a vehicle speed sensor may be configured to determine the speed at which vehicle 10 is traveling. In some embodiments, vehicle speed sensor may be a sensor configured to determine the number of revolutions one or more wheels (e.g., wheels 34) are turning over some period of time. This number of revolutions may be translated into vehicle speed through one or more known calculations that may be performed on vehicle speed sensor or that may be performed by processor 108. In some embodiments, vehicle speed sensor may be a radar, sonar, or other device that uses, e.g., the Doppler effect, to determine the speed at which vehicle 10 is traveling. For example, a radar may be used to transmit a beam to a roadside object, such as a traffic sign, and the speed of vehicle 10 can be determined based upon the change in frequency of the beam upon bouncing back from the roadside object. In some embodiments, the vehicle speed may be used as a parameter in determining a camera mode and may also be used to determine the time-delay trigger implemented in the camera activation system.

In still other embodiments, vehicle 10 may communicate with roadside units of a vehicle-to-infrastructure (V2I) communications system or one or more other vehicles (V2V communications) (both referred to as V2X communications) to determine and/or receive information indicative of the speed at which it is traveling. These V2X communications may occur between one or more roadside units and/or one or more other vehicles. They can be received directly by hazard light control component 102 or another electronic control unit or other communications component of vehicle 10 (and forwarded to hazard light control component 102 vis data interface 104).

The illustrated example also includes other additional sensors 258 that may be included to sense and provide data that can be used to determine a motor determine whether one or more cameras should be activated and the resultant imagery displayed to the driver.

Vehicle systems 158 in the illustrated example include positioning system 274 (e.g. a global positioning system), vehicle display 276, user interface 278, and other vehicle systems 280. A GPS or other position determination system 274 can be used to provide geolocation support for the vehicle. Position determination system 274 can be used to determine vehicle position such as, for example, in terms of latitude, longitude and altitude. Where the system is implemented as a navigation system, destinations may be entered and routes calculated, and this information may be used to determine additional factors such as, for example, the types of road anticipated for vehicle travel (e.g., paved or unpaved, street, highway, etc.), the type of terrain anticipated, the weather that may be encountered along the way, whether the intended vehicle destination may require a particular mode (e.g., a boat ramp, parking lot, off-road location, and so on) and other factors that may be determined from a positioning and routing system.

Positioning system 274 can include global positioning system and other navigation systems to detect vehicle parameters such as, for example, vehicle position, vehicle speed, vehicle direction of travel, and so on. GPS 252 can also provide information to camera mode circuit 210 regarding parameters of the road on which the vehicle is traveling and parameters about the environment that the vehicle is approaching. For example, GPS 252 can provide information regarding a rugged terrain that the vehicle is approaching, this information is useful for camera mode circuit 210 in determining field of view of the one or more cameras in vehicular camera and display system 200. In some embodiments, GPS sensor 252 may be used in conjunction with the vehicle speed sensor and current or projected path to determine the time-delay trigger for the camera activation system. In some embodiments, the GPS sensor 252 may be used in conjunction with the current or projected weather forecast to determine that the criteria for one or more camera modes, such as a snow camera mode has been satisfied. When the criteria of a camera mode, such as the snow camera mode, has been satisfied, it may be made available to the driver with the activation of the physical or virtual camera activation button. GPS sensor 252 can be used to determine where the camera activation system should make a particular camera mode, such as an ascend camera mode or descent camera mode, available to the driver or user. It should be understood that although other types of sensors/receivers operable in other types or forms of positioning/location systems, e.g., GLONASS, GALILEO, BEIDOU, etc.

Vehicle display 276 may include one or more displays on which camera images can be provided. In some applications, a single display may be provided for displaying camera images to the vehicle occupants. This can include, for example, a dedicated display or a display that has shared usage with other vehicle systems such as a multimedia interface head unit, navigation system display or other vehicle display. In other applications, multiple displays may be provided for displaying camera images to the vehicle occupants. These can include dedicated displays for camera functions or multi-purpose display such as displays used for navigation, a multi-media head unit, a dashboard display and so on. The displays can be used for single image displays or they can be operated in a split screen mode to allow multiple functions to be served by a single display screen. In various embodiments, images from one or more cameras can be routed to one or more displays, and the selection and routing of images to displays can be determined based on the selected mode.

User interface 278 can also be included to allow the user to control camera mode circuit 210. For example, user interface 278 can provide one or more buttons, switches, knobs, dials, wheels, joysticks, pads, touchscreens, or other actuators to allow the user to control some or all of camera mode circuit 210. User interface 278 may also include voice command circuitry. User interface 278 may be implemented to allow the operator or other vehicle occupant to control the functions of camera mode circuit 210 such as, for example, to manually select modes, to respond to prompts from camera mode circuit 210, to manually select and map camera images to one or more displays, and to otherwise interact with camera mode circuit 210.

Other vehicle systems 280 may also interact with camera mode circuit 210 and other components of vehicular camera and display system 200.

Cameras 160 in the illustrated example include one or more front-facing cameras 264, side-facing cameras 266, and rear-facing cameras 268. In various embodiments, vehicular camera and display system 200 can make use of existing cameras that may be present on the host vehicle, it can augment existing cameras with one or more additional cameras, or it can include its own cameras depending on how the host vehicle is equipped or intended to be equipped. Although illustrated separately, cameras 160 can be part of sensors (e.g. sensors 52) of the host vehicle.

Front-facing cameras 264 can include one or more cameras positioned to capture images to the front of the vehicle such as, for example, grill or bumper mounted cameras, or cameras mounted behind the windshield in facing in the forward direction. Side-facing cameras 266 can include one or more cameras mounted to capture images to either or both sides of the vehicle. These can include, for example, one or more cameras mounted on the side-view mirrors of the vehicle, on vehicle fenders, on the vehicle side skirts, on the vehicle bumpers on the vehicle A, B or C pillars, along the roof line, or otherwise mounted to capture images on either or both sides of the vehicle. Rear-facing cameras 268 can include one or more cameras mounted to capture images to the rear of the vehicle. These can include cameras mounted, for example, on the rear bumper, on the trunk release mechanism, near the license plate frame, and so on. Although not illustrated, additional cameras can be included for a vehicular camera and display system 200. These may include, for example, additional camera or cameras mounted at desirable locations on the vehicle one or more cameras mounted on a trailer attached to the vehicle, one or more cameras mounted to a roof rack, bicycle rack, or other auxiliary storage unit appended to the vehicle, and so on.

Figure 3:
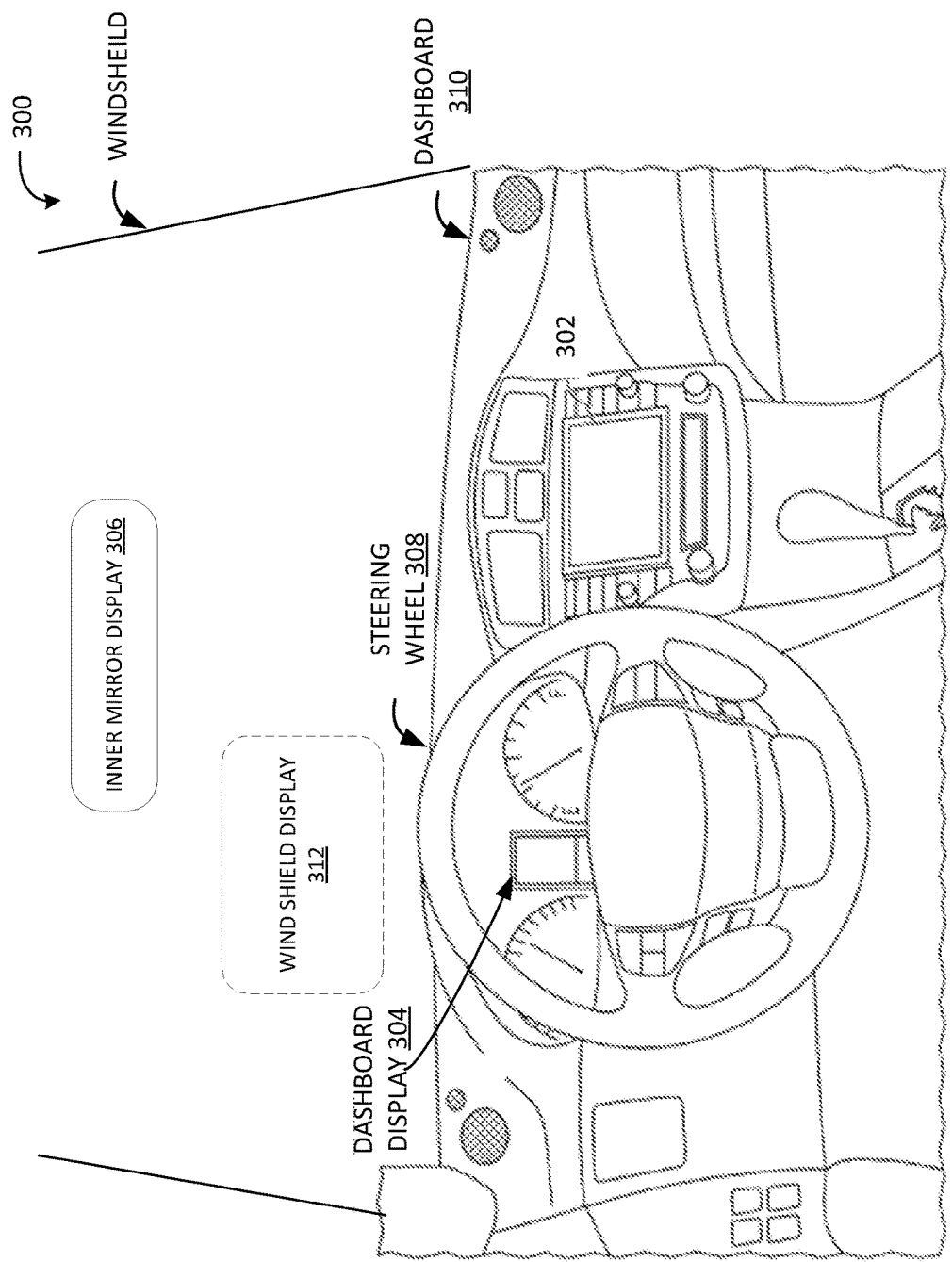
FIG. 3 illustrates an example interior in which vehicle camera activation system is implemented in accordance with one embodiment described herein.

FIG. 3 illustrates an interior of a vehicle, e.g., vehicle 10, with which a camera activation system in accordance with various embodiments may be implemented. The interior 300 of vehicle 10 may comprise a plurality of displays that make up vehicle display 276. In the illustrated example, these include multi-media display 302, dashboard display 304, inner mirror display 306 and windshield display 312 (e.g., a heads-up display unit). Multi-media display 302 may provide a visual and tactile interface to an entertainment system, navigation system and other vehicle functions such as climate control. Moreover, multimedia display 302, or other like dashboard, console, center-stack or other multimedia displays may include touchscreen functionality, and provide one or more virtual buttons or menu selections to activate and operate vehicular camera and display system 200.

In some embodiments, the images captured by the one or more cameras mounted on vehicle 10 are displayed on one or more of these various displays, and the selection of which camera's images are mapped to which display can be selected based on a determined operating mode of the camera activation system. For example, the images captured by one or more cameras can be mapped to one or more of multi-media display 302, dashboard display 304, inner mirror display 306, windshield display 312, and other displays if provided.

The mapping of cameras to displays can be user selectable on the fly, or user programmable to a number of different modes. That is a user may determine which camera or cameras he or she wishes to map to the one or more displays available in the vehicle. The user may do this mapping to suit his or her preferences for each of the various operating modes, or the user may do this in real time to form a custom configuration. Additionally, pre-programmed mapping for each mode can be included with the system.

For example, in some embodiments, inner mirror display 306 is a mirror that allows the driver to view the area behind vehicle 10. Inner mirror display 306 can be implemented in some applications as a dual-purpose apparatus. For example, it can be implemented to function as a conventional mirror with an optically reflective surface during normal operations, and can also double as an LED or other like display to display camera images such as, for example, images from a rear-facing camera. In an example scenario, the system can be configured such that inner mirror display 306 operates as a conventional mirror during normal vehicle operations, and operates as a camera display during certain modes. For example, when the camera activation system is in a towing mode (e.g., because the presence of a trailer is detected by one or more sensors, or because an operator manually entered the system into that mode), inner mirror display 306 can be switched to display images from one or more rear-facing cameras such as one or more cameras at the rear of the vehicle and one or more cameras at the rear of a trailer. As another example, inner mirror display 306 may display images from a rear-facing camera at the rear of the vehicle during normal operations, and switch to displaying images from a rear-facing camera at the rear of the trailer when the system is in the tow mode.

Accordingly, when the camera activation system determines that the tow mode should be entered (or when the user selects the tow mode), inner mirror display 306 displays an appropriate camera image stream for the tow mode. The camera from which the image stream is taken can a user-selected camera, or vehicular camera and display system 200 may determine which camera or cameras of the various system cameras should be displayed. For example, the system can determine that the view from a rear-facing camera or cameras located on the trailer are appropriate to show the area directly behind the trailer. Similarly, while in tow mode, other cameras can be mapped to other displays. For example, side view cameras mounted on the trailer, can be mapped to other displays in the vehicle.

In some embodiments, one or more of multi-media display 302, dashboard display 304, inner mirror display 306 and windshield display 312 can be configured to display image streams from the various cameras or images captured from the devices of imaging system 250. As alluded to above, multi-media display 302, dashboard display 304, inner mirror display 306 and windshield display 312 may each be configured to display image streams from more than one camera, such as captured images from the front, rear or side facing cameras mounted at the and, if included, a trailer. In yet other embodiments, multi-media display 302, dashboard display 304 or inner mirror display 306 can display images or videos from more than one camera mode, for example, any one of the above mentioned displays can be configured to operate in a split-screen mode such that each section of the display has the 2 display a different camera streams independently of each other. For example, the multi-media display 302 can display a rear view of the vehicle on half of the screen, and on the other half of the screen, a forward, or side or surround view of the vehicle can be displayed at the same time. This function may be useful in a number of modes including the multi-terrain camera mode, in which the vehicle is navigating a rugged, uneven terrain, and a surround view of the vehicle will be useful for the driver to navigate the terrain.

As noted above, the camera activation system can be activated manually when the driver presses a virtual button (e.g., located on multi-media display 302), or a physical button (e.g., on steering wheel 308, console or dashboard), speaks an appropriate voice command, or otherwise manually activates the system. In some embodiments, the actuator that activates the camera activation system is located within reach of the driver, in the area surrounding multi-media display 302 or other area on dashboard 310. In one embodiment, when the driver activates the camera activation system, the driver is able to override the current display on a vehicle display. For example, the driver can configure one or more of the displays with a different image stream based on his or her selection. In some embodiments, the selection is momentary and lasts only as long as the driver is pressing the actuator. As soon as the driver releases the actuator, the vehicle display returns to displaying the previous camera mode. In other embodiments, the selection is not momentary, but can be configured to change the mode until the mode is change back by the user or the system.

Figure 4:
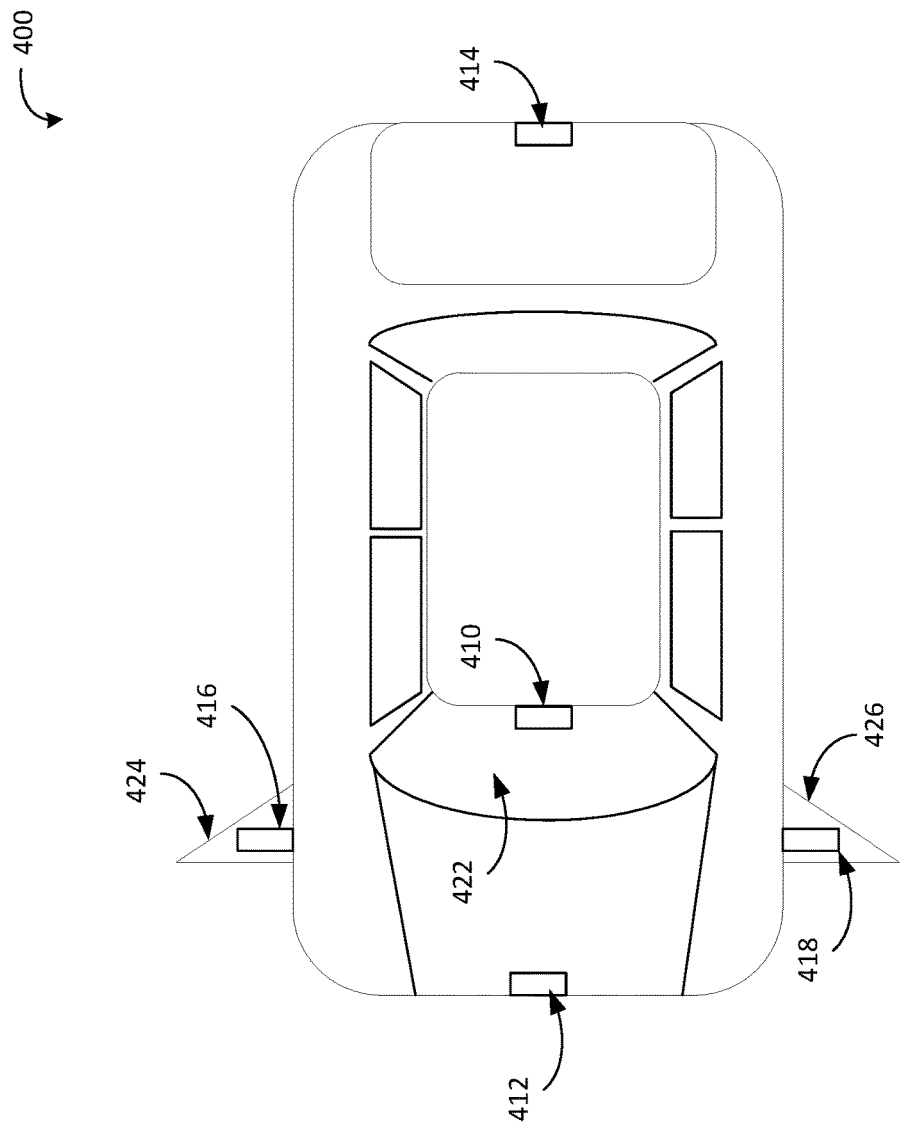
FIG. 4 illustrates a top view of an example vehicle showing placements of a plurality of cameras which make up the vehicle activation system in accordance with one embodiment of the systems and methods described herein.

FIG. 4 illustrates a top view of an example vehicle 400 showing placements of a plurality of cameras that make up the camera vehicle activation system in accordance with one embodiment of the systems and methods described herein. In this example, forward facing cameras 410 and 412 are mounted in the interior of the vehicle on windshield 422 and on the front of the car respectively, both facing in the forward direction. In some embodiments, forward facing cameras are placed in other locations of the vehicle, providing images in front of the vehicle.

Side cameras 416 and 418 in this example are mounted on side mirrors 424 and 426 respectively. In some embodiments, side cameras 416 and 418 are mounted on the bottom of side mirrors 424 and 426 such that they give the driver a view of the area immediately beside the car along with the sides of the car. This may be useful when the driver is parking the vehicle, is operating in rough terrain, or in other applications. Side cameras 416 and 418 (or additional cameras, not illustrated) may also be mounted to give the driver a view of the lane on either side of the driver, which is useful when the driver is trying to change lanes on roads or highways. Side cameras may also be mounted on fenders, side skirts, bumpers, A, B and C pillars, the roof and other locations offering an appropriate view to the side or quarter views as well. Although the illustrated example includes two side cameras 416, 418, other embodiments can include multiple cameras on each side of the vehicle.

Rear-facing camera 414 in this example is mounted on the back of the vehicle and gives the driver a view to the rear of the vehicle. Although one rear-facing camera for 14 is illustrated, other embodiments can include multiple rear-facing cameras. For example, different camera placements can be made and additional cameras can be included for one or more rear-facing cameras. These may include, for example, a cargo camera or truck-bed camera which may be mounted on the roof near the rear part of the vehicle to provide a view of the cargo or truck bed portion of the vehicle. The combination of forward facing cameras 410 and 412, side facing cameras 416 and 418 and rear-facing camera 414 may give the driver a surround view of the vehicle, which may be useful during various modes of operation.

Figure 5:
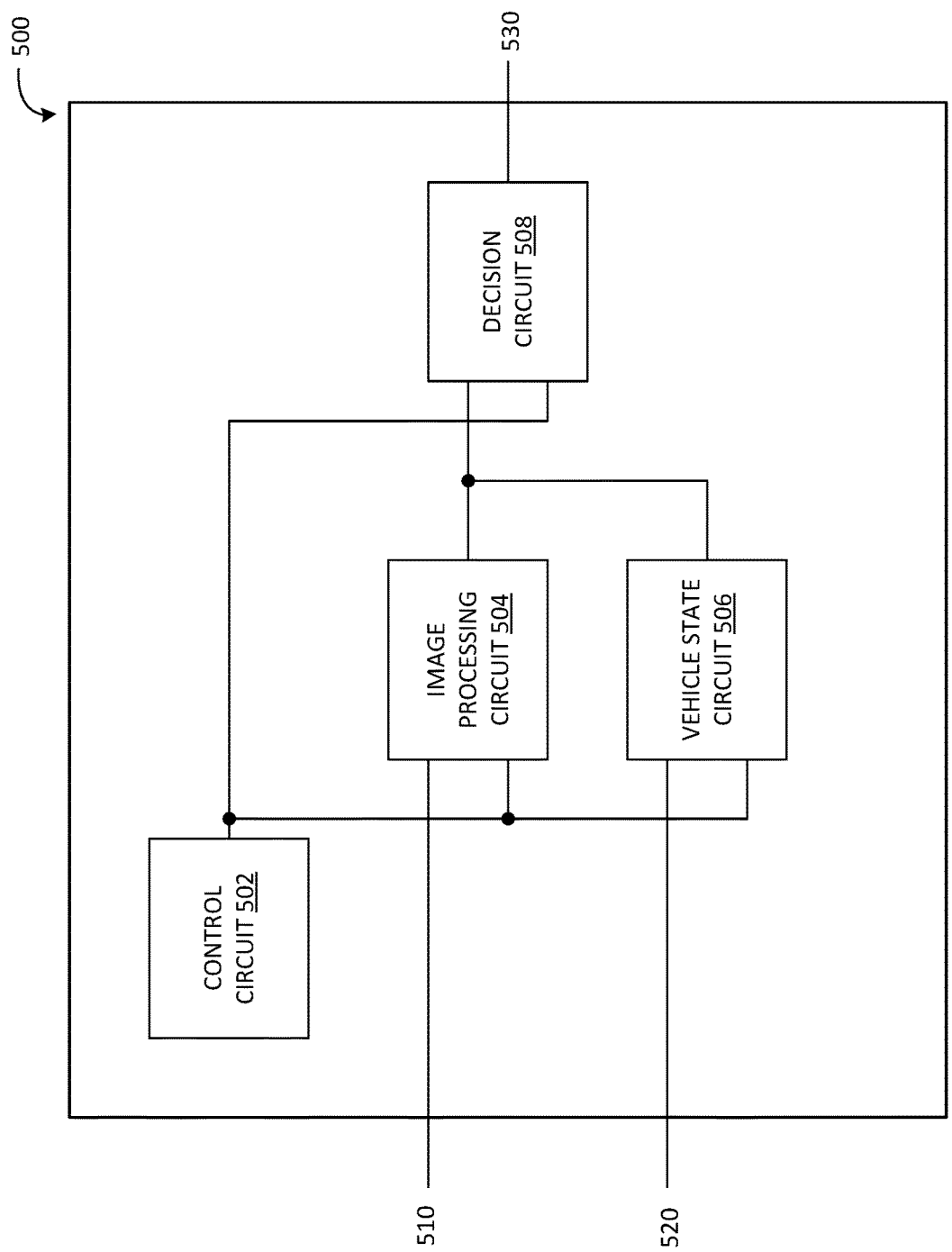
FIG. 5 illustrates an example circuit block diagram of the processor in accordance with one embodiment of the systems and methods described herein.

As noted above, although mode circuit 203 includes a processor 206, the functions of mode circuit 203 may be implemented using alternative circuitry as well. FIG. 5 illustrates an example circuit block diagram 500 for mode circuit 203 in accordance with one embodiment of the systems and methods described herein. Circuit block diagram 500 in this example includes control circuit 502, image processing circuit 504, vehicle state circuit 506 and decision circuit 508.

Control circuit 502 may be configured to facilitate communication between image processor circuit 504 and imaging system 250. In some embodiments, control circuit 502 is configured to facilitate communication between memory (e.g. memory 208) and processor circuit 504 by sending the criteria which needs to be satisfied before a particular camera mode is made available to the user from memory 208 to optional decision circuit 508.

Image processor circuit 504 may receive input 510 of captured images or video from imaging system 250. In some embodiments, image processor circuit 504 detects road conditions from the captured images or video, or weather conditions such as rain, snow or fog activity that the vehicle is approaching or is currently experiencing. In some embodiments, image processor circuit 504 may receive data at input 510 regarding a vehicle yaw event and may determine that the current field of view of one or more cameras of imaging system 250 needs to be adjusted. Imagine processor circuit 504 may digitally manipulate the captured images or video and send a subset of the captured image to one of the displays in the interior of the vehicle, to allow the driver to have a more meaningful view of the captured images or video. For example, if vehicle 10 detects that the vehicle is in an ascend mode, image processing circuit may be configured to determine when the vehicle approaches the crest of the hill. In this circumstance, the forward facing camera view will show mostly sky, with only a lower portion of the captured images showing the road (see FIG. 8B). Displaying an image or video similar to that of screen 850 may not be useful to the driver. A more meaningful and useful view of the captured images or video may be cropped portion 860, giving the driver visual information regarding the road condition ahead. In one embodiment, the camera activation system dynamically electronically crops the captured image stream as the vehicle approaches the crest of the uphill slope and the captured images or video showing the portions of the frame more useful to the driver.

Vehicle state circuit 506 may determine information regarding the current state of the vehicle at input 520 from GPS sensor 252 or additional other sensors 258. Current state of the vehicle may include parameters such as the current speed of the vehicle, angle of elevation, geolocation, etc. Current and forecasted surroundings of the vehicle may include the current and projected weather conditions according to the location of the vehicle and/or the projected path of travel of the vehicle, traffic conditions on the path of travel and/or projected path of travel of the vehicle.

Using information from vehicle state circuit 506 and image processing circuit 504, decision circuit 506 may determine if the criteria of one or more camera modes are currently satisfied. When the criteria of a camera mode are satisfied, it may be made available to the driver with the push of the physical or virtual button. In other embodiments, when the criteria of a camera mode are satisfied, decision circuit 504 may automatically send the captured, or processed images or video to one of the displays in the interior of vehicle 10. In yet other embodiments, when the criteria of two or more camera modes are satisfied, decision circuit 504 may prioritize the two or more camera modes, and make the higher priority camera mode available to the driver automatically or when the driver makes a request of the camera activation system.

Figure 6:
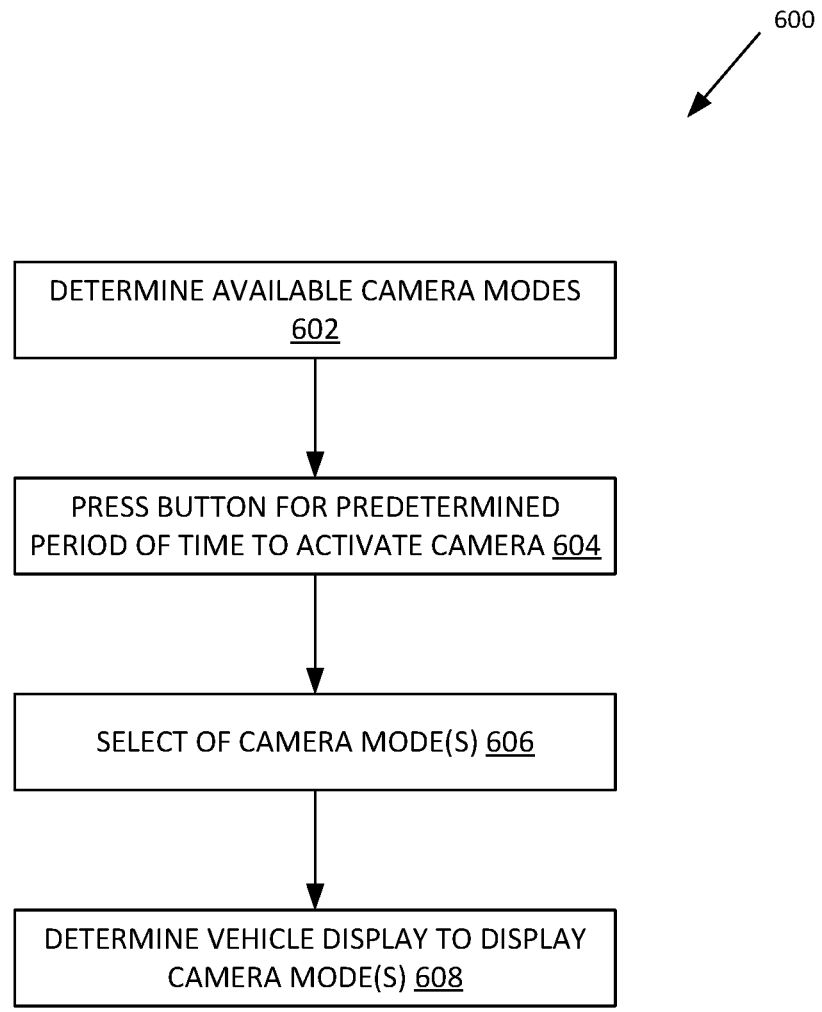
FIG. 6 illustrates an example process for activation of the vehicle camera system in accordance with one embodiment described of the systems and methods described herein.

FIG. 6 illustrates an example process 600 for activating the vehicle camera system in accordance with one embodiment of the systems and methods described herein. At operation 602, camera mode circuit 210 may determine the camera modes that are available to camera mode circuit 210 by sending request to sensors 152 via communication circuit 201. Sensors 152 may receive the request for information from camera mode circuit 210 and imaging system 250 may send captured images and video to processor 206 of camera mode circuit 210 via communication circuit 201. GPS sensor 252 may send geolocation information to processor 206 of camera activation via communication circuit 201. In some embodiments, communication circuit 201 may receive current or projected weather forecast. Decision circuit 508 may receive information regarding the current or projected weather forecast from communication circuit 201 and together with the output of image processing circuit 504, which may detect the presence of weather features such as rain, snow, fog, etc. and determine if the criteria for one or more camera modes are satisfied. At any given time, the criteria of more than one camera mode may be satisfied. An output 530 of decision circuit 508 may be sent to vehicle display 276. In this example, sensor information is received based on requests by camera mode circuit 210. In other applications, camera mode circuit 210 need not pull sensors for information, and instead sensors constantly or periodically send information as available.

At operation 604, the driver makes a request of the vehicular camera and display system 200. In some embodiments, the driver makes this request by activating the physical or virtual actuator within reach of the driver. Some embodiments may require the user to press a button or other switch for a predetermine period of time, to ensure that the activation is not accidental. In some embodiments, the driver may make a request of the camera activation system by utilizing a voice activated command. In such an embodiment, the vehicle would be equipped with voice activation, which, in response to certain verbal cues would activate some electrical or mechanical component of the vehicle, for example, the driver would say "turn on snow camera mode," and the camera activation system would activate the one or more cameras associated with the snow camera mode and display them on one or more displays located in the interior of the vehicle if the criteria for the snow camera mode has been satisfied. In some embodiments, step 602 may be skipped, and available camera modes does not need to be determined, and any camera mode can be requested, regardless of whether or not the criteria for the camera mode has been satisfied.

At operation 606, decision circuit 508, may prioritize the available camera modes if the criteria for two or more camera modes are satisfied. The selection of the camera modes may be done by the driver or it could be accomplished automatically without input from the driver. In one embodiment, processor 206 may prioritize the two or more available camera modes and determine the camera mode to display upon receipt of the camera activation request from the driver. In some embodiments, the user may request a desired camera mode, and if the camera mode is available to the driver then the desired camera mode will be displayed in the next step.

At operation 608, image streams from one or more cameras are displayed on one or more displays located in the interior of the vehicle. In one embodiment, if a different image stream is already being displayed on, for example, snow camera mode is already displayed multi-media display 301 of FIG. 3, the driver's request of a second camera mode may be displayed on a first portion of multi-media display 302 and the second camera mode, such as ascend camera mode may be displayed on a second portion of multi-media display 302 with each camera mode receiving half of the screen area of the multi-media display 302. In other embodiments, the multi-media display 302 is split in other ratios; while in yet other embodiments, the driver may customize how he/she would like the screen to be split. In various applications, the screen may be split horizontally, vertically, diagonally, etc. for example, in some embodiments, three or more camera modes may be displayed on a first, a second and a third portion of the multi-media display 302. In one embodiment, the driver's request of the vehicular camera and display system 200 may cause the vehicular camera and display system 200 to replace the camera mode being displayed on multi-media display 302 with a desired camera mode while the driver has his/her finger on the physical or virtual button to activate the vehicular camera and display system 200. In the presented embodiments above, the one or more camera modes are displayed on the multi-media display 302, it can be appreciated that instances of the multi-media display 302 can be replaced with dashboard display 304, inner mirror display 306 or windshield display 312.

Figure 7:
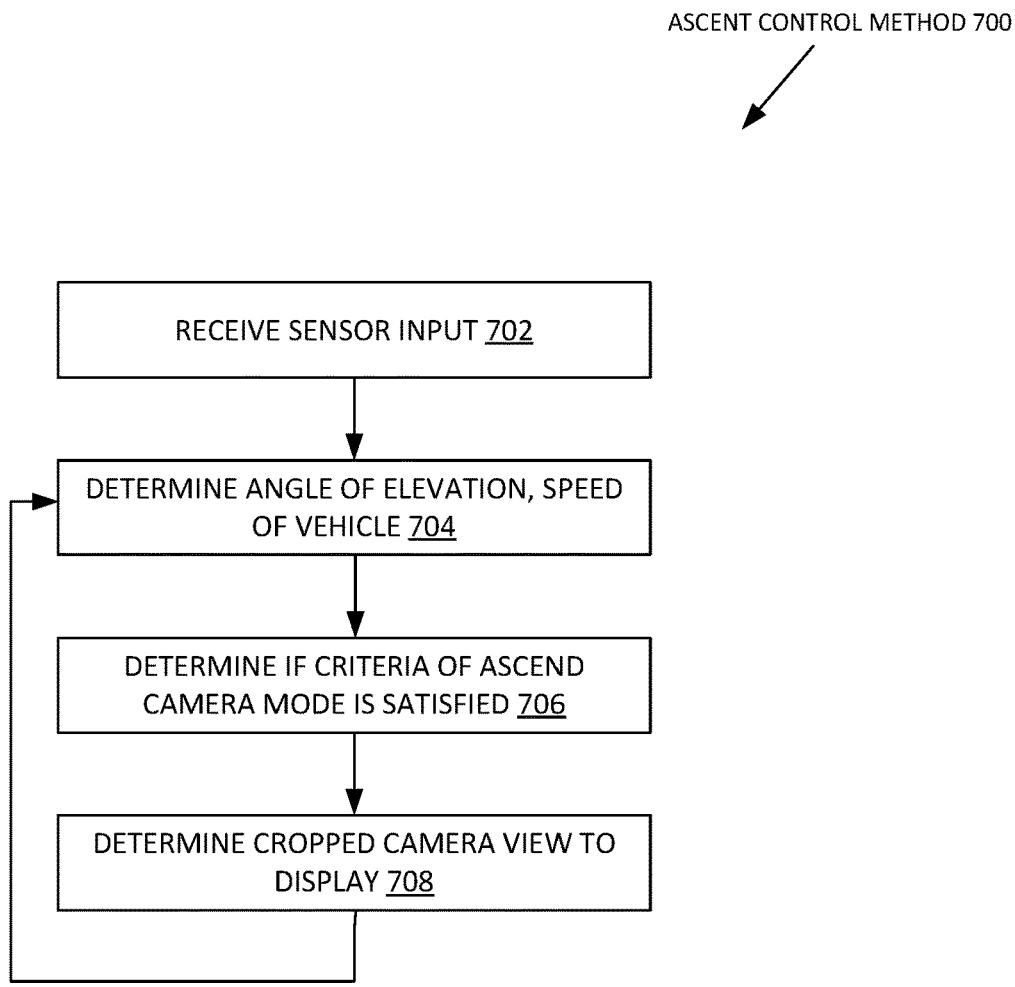
FIG. 7 illustrates an example process for activation of an ascend camera mode of the vehicle camera system in accordance with one embodiment described herein.

FIG. 7 illustrates an example process 700 for activating an ascend camera mode of vehicle camera and display system 200 in accordance with one embodiment of the systems and methods described herein. Process 700 may be one component of step 602 of FIG. 6. At operation 602, processor 206 of camera mode circuit 210 determines the camera modes that are available to the vehicular camera and display system 200, one of the possible camera modes being the ascend camera mode.

At operation 702, image processing circuit 504 of processor 206 receives input 510 of captured images or video from imaging system 250.

At operation 704, vehicle state circuit 506 of processor 206 receives input 520 from GPS sensor 252 or additional other sensors 258. Vehicle state circuit 506 may determine an angle of elevation, vehicle speed and geolocation of the vehicle. Image processing circuit 504 may detect from the captured images and video that the vehicle is approaching a road grade, geolocation information from GPS sensor 252 can verify that the vehicle is approaching a location with a change in road grade.

At operation 706, decision circuit 508 may receive information regarding the angle of elevation, speed and geolocation of the vehicle and determine if the criteria for the ascend camera mode is satisfied.

At operation 708, image processing circuit 504 may crop a portion of the captured images or video and output the cropped portion of the captured images or video to vehicle display 276 when the snow camera mode is requested. In one embodiment, the driver makes a request of the camera activation system, and the snow mode is displayed on vehicle display 276 if decision circuit 504 prioritizes the snow camera mode over all other camera modes, or if the snow camera mode is the only camera mode in which the camera mode criteria is satisfied. Image processing circuit 504 may dynamically adjust the cropped portion of the captured image or video as the vehicle approaches the crest of the uphill slope.

Figure 8A:
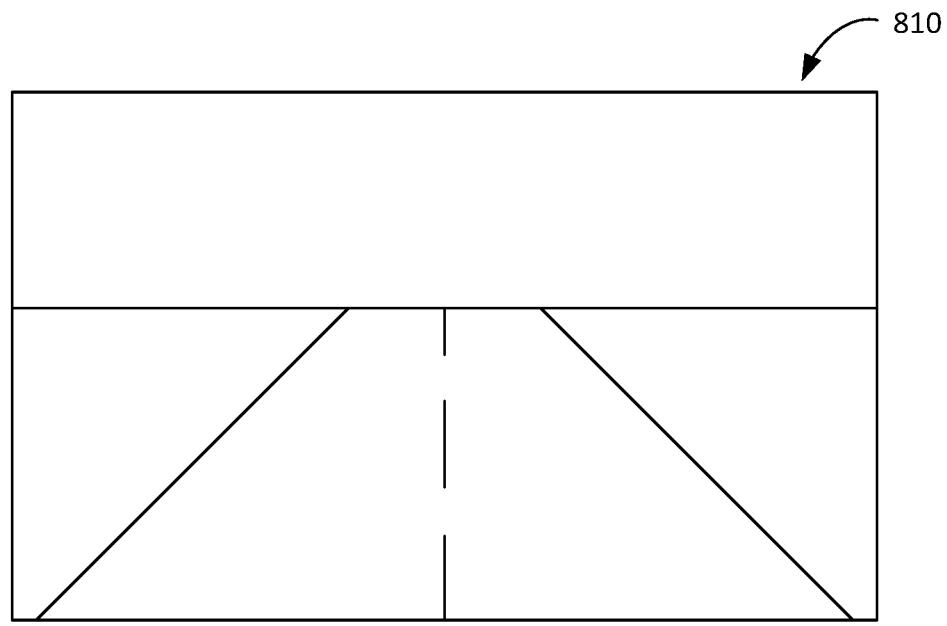
FIG. 8A illustrates a sample image from the forward facing camera of the vehicle equipped with the camera activation system.
Figure 8B:
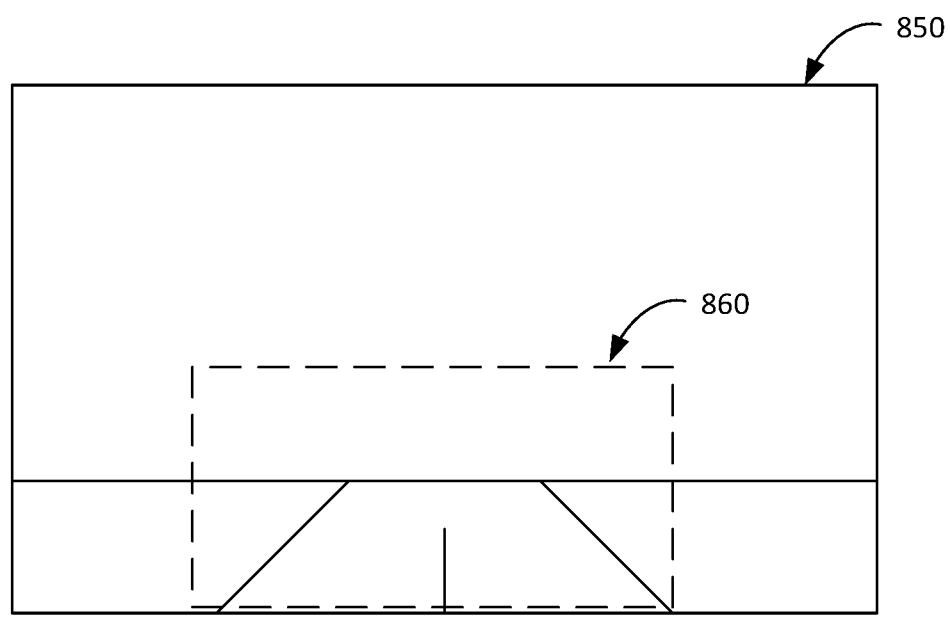
FIG. 8B illustrates a sample image from the forward facing camera of the vehicle equipped with the camera activation system when the vehicle approaches the crest of the uphill slope.

FIG. 8A illustrates a screen 810 from forward facing camera 412 of FIG. 4. FIG. 8B illustrates a screen 850 from forward facing camera 412 of FIG. 4 as the vehicle approaches the crest of an uphill slope. When the vehicle approaches the crest of the uphill slope, the forward facing camera will show mostly sky, with a lower portion of the captured images or video showing the road, as seen in FIG. 8B. Vehicular camera and display system 200 may crop a portion 860 of screen 850 and display the cropped portion 860 in one of the interior display of vehicle 10. Vehicular camera and display system 200 may dynamically adjust the cropped portion of the captured image or video as the vehicle approaches the crest of the uphill slope.

Figure 8C:
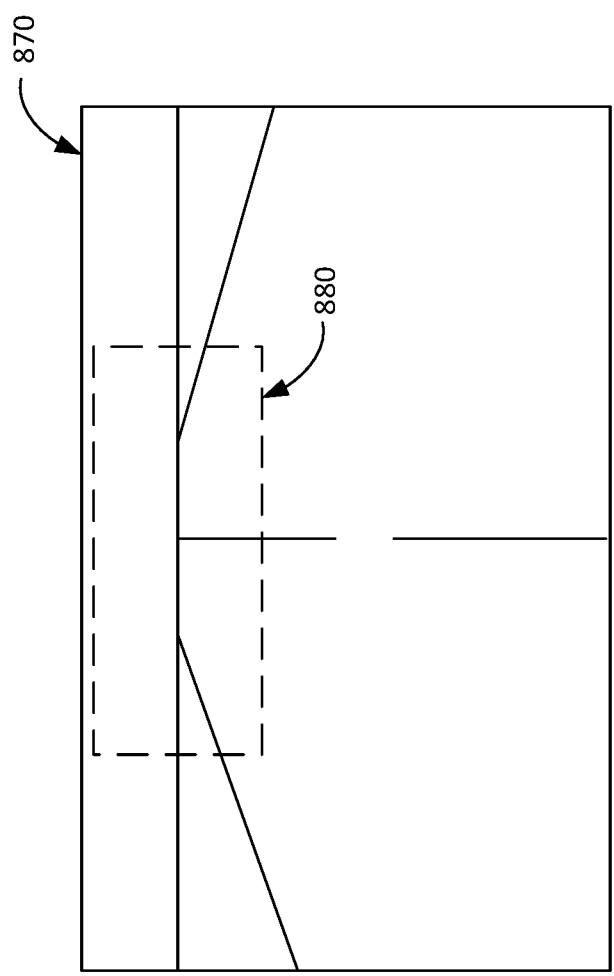
FIG. 8C illustrates a sample image from the forward facing camera of the vehicle equipped with the camera activation system when the vehicle approaches the bottom of a downhill slope.

Similarly, FIG. 8C illustrates a screen 870 from forward facing camera 412 of FIG. 4 as the vehicle approaches the bottom of a downhill slope. When the vehicle approaches the bottle of the downhill slope, the forward facing camera will show more road with the upper portion of the captured images or video showing the sky, as seen in FIG. 8C. Vehicular camera and display system 200 may crop a portion 880 of screen 870 and display the cropped portion 880 in one of the interior display of vehicle 10. Vehicular camera and display system 200 may dynamically adjust the cropped portion of the captured image or video as the vehicle approaches the bottom of the downhill slope.

Figure 9:
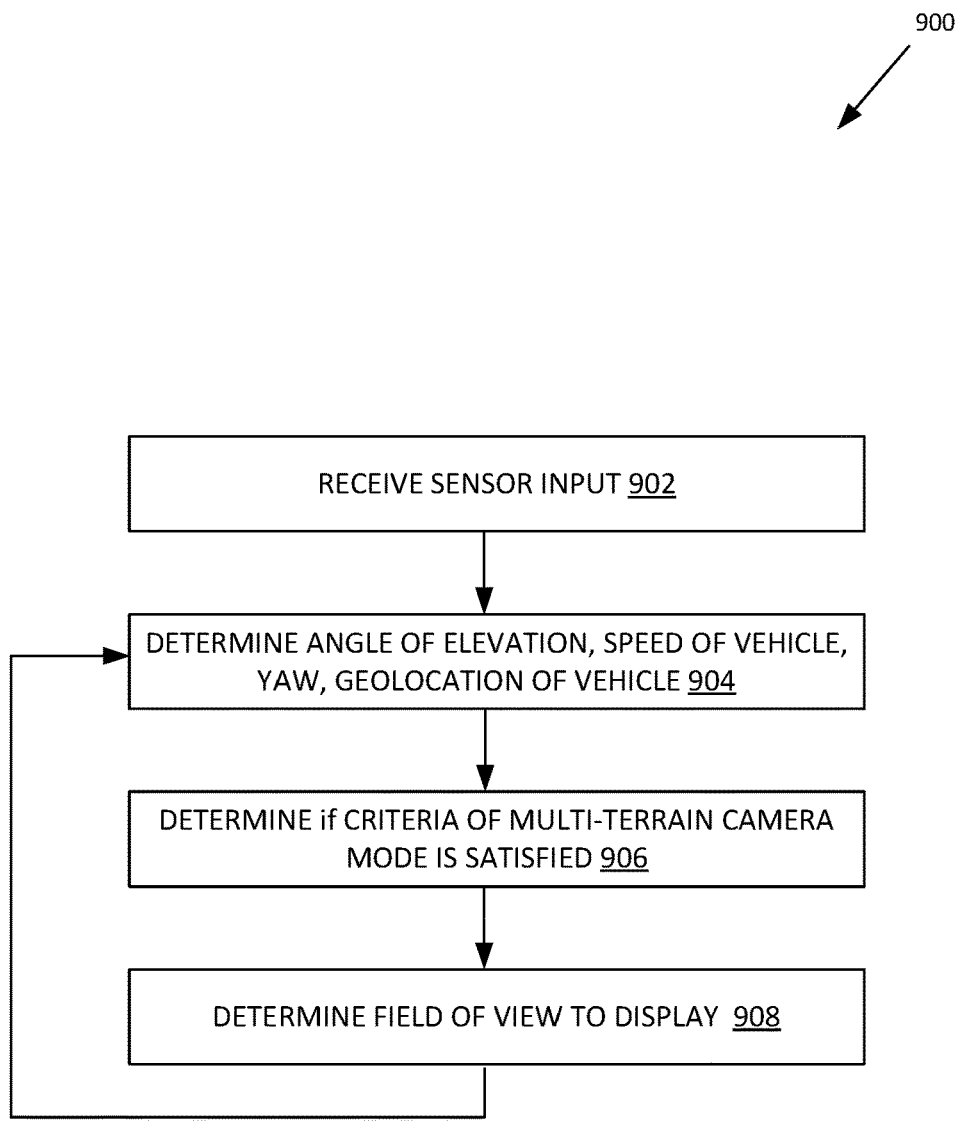
FIG. 9 illustrates an example process for the multi-terrain camera mode of the camera activation system in accordance with one embodiment described herein.

FIG. 9 illustrates an example process 900 for activation of a multi-terrain camera mode of vehicular camera and display system 200 in accordance with one embodiment of the systems and methods described herein. Process 900 may be one component of step 602 of FIG. 6.

At operation 902, similar to step 702, image processing circuit 504 of processor 206 receives input 510 of captured images or video from imaging system 250.

At operation 904, vehicle state circuit 506 of processor 206 receives input 520 from attitude sensors 244 (e.g., yaw), GPS sensor 252 or other sensors 258. Vehicle state circuit 506 may determine an angle of elevation, yaw and geolocation of the vehicle. Image processing circuit 504 may detect from the captured images and video that the vehicle is approaching or in a rugged terrain, geolocation information from GPS sensor 252 can verify that the vehicle is approaching a location with a rugged terrain.

At operation 906, decision circuit 508 may receive information regarding the angle of elevation, vehicle speed, yaw and geolocation of the vehicle and determine if the criteria for the multi-terrain camera mode is satisfied.

Figure 10:
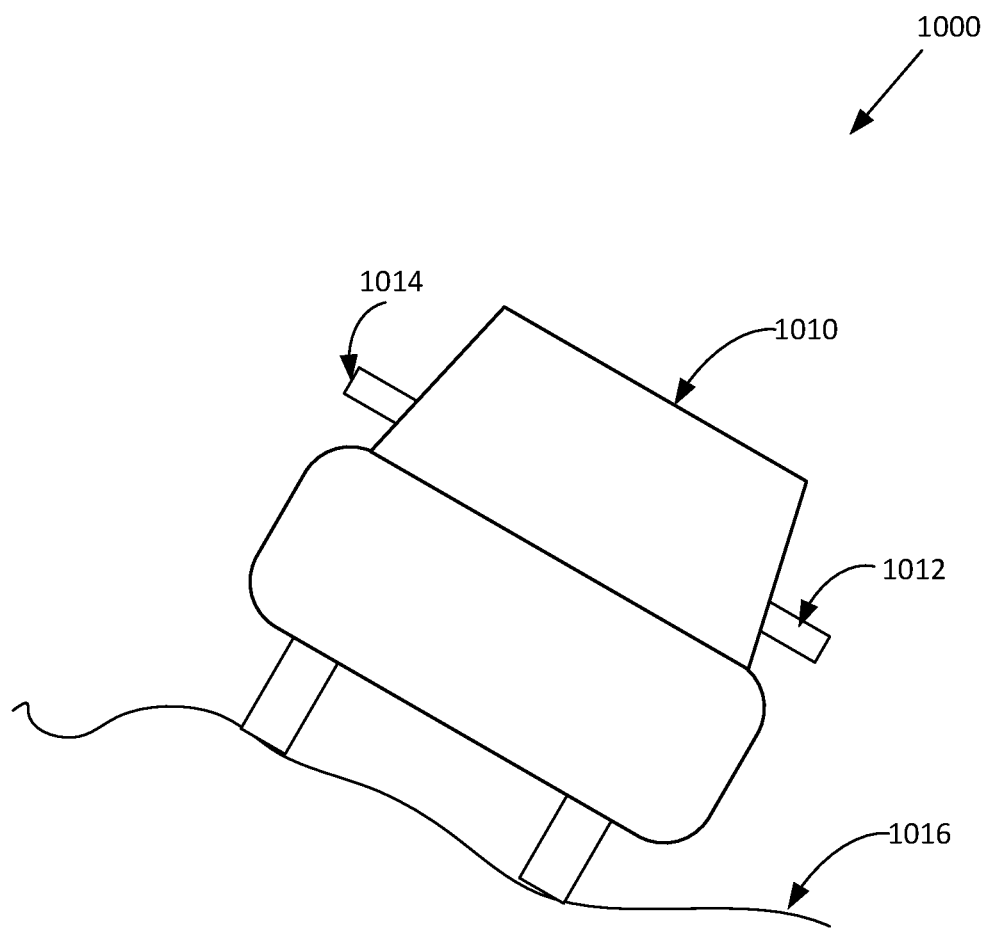
FIG. 10 illustrates a view of a vehicle in multi-terrain mode of the camera activation system in accordance with one embodiment described herein.

At operation 908, image processing circuit 504 determines the field of view to display. Process 900 goes back to operation 904 as new sensor input is received with decision circuit 508 determining if the criteria of multi-terrain mode is satisfied as new sensor input is received. Referring to FIG. 10, which illustrates a view 1000 of the vehicle in multi-terrain camera mode. Vehicle 1010 is travelling along a rugged terrain, landscape 1016 is uneven, the images and video captured by a camera mounted on side mirror 1012 may have a completely different road/sky ratio from the images and video captured by a camera mounted on side mirror 1014. To provide a meaningful and useful view of the captured images or video, image processing circuit 504 may crop images and video captured by the camera mounted on side mirror 1012 in a way similar to crop portion 880 of FIG. 8C, while the images or video captured by the camera mounted on side mirror 1014 may be cropped in a way similar to crop portion 860 of FIG. 8B. Different cameras of camera activation system can show different fields of view.

Figure 11:
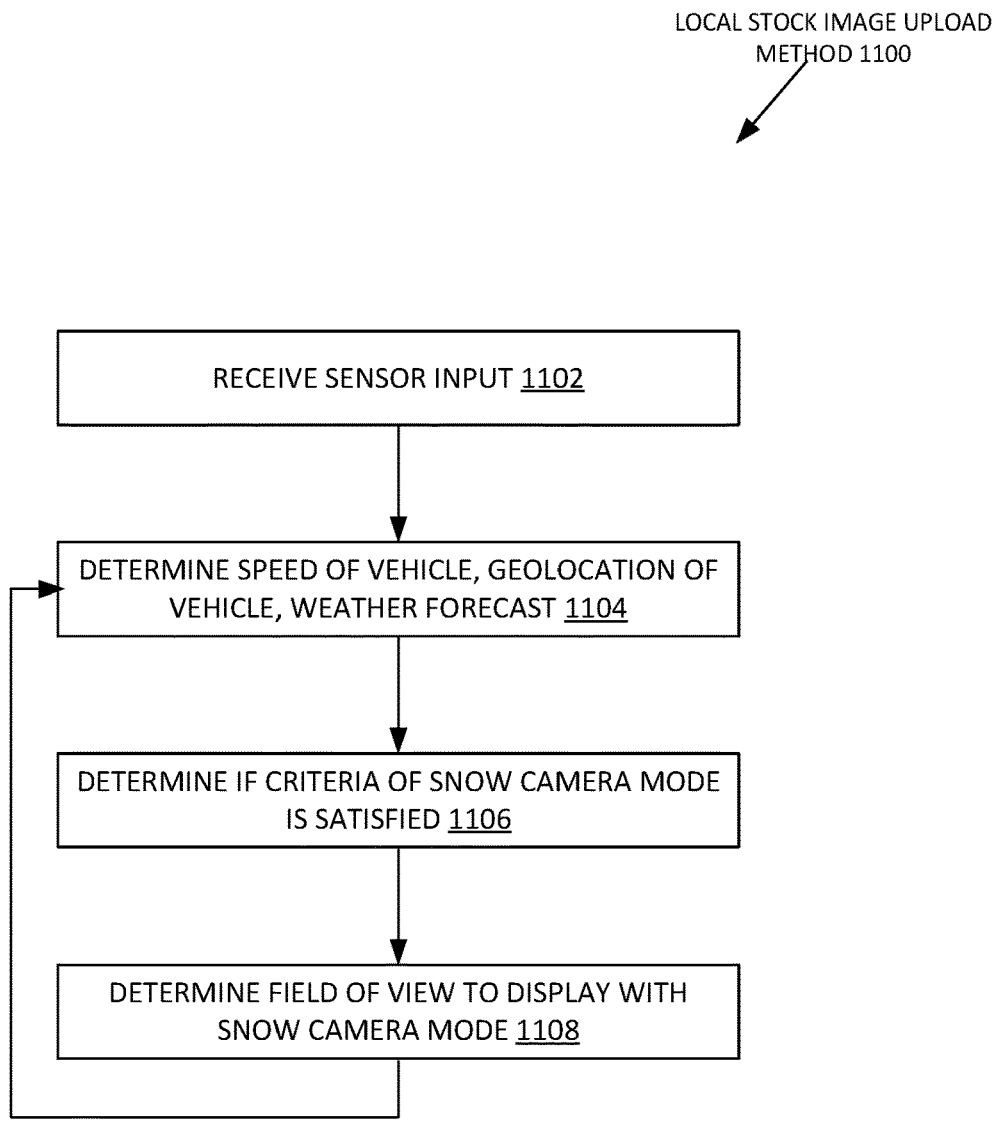
FIG. 11 illustrates an example process for the snow camera mode of the vehicle camera system in accordance with one embodiment described herein.

FIG. 11 illustrates an example process 1100 for the snow camera mode of vehicular camera and display system 200 in accordance with one embodiment of the systems and methods described herein. Process 1100 may be one component of step 602 of FIG. 6.

At operation 1102, similar to step 702, image processing circuit 504 of processor 206 receives input 510 of captured images or video from imaging system 250.

At operation 1104, vehicle state circuit 506 of processor 206 receives input 520 from GPS sensor 252 or additional other sensors 258. Vehicle state circuit 506 may receive vehicle speed, geolocation of the vehicle and current and forecasted weather conditions according to the geolocation of the vehicle. Image processing circuit 504 may detect from the captured images and video that the vehicle is approaching a location experiencing snowy conditions. The current and forecasted weather conditions determined for the geolocation of the vehicle can verify that the vehicle is approaching a location experiencing snowy conditions.

At operation 1106, decision circuit 508 may receive information regarding the vehicle speed, geolocation of the vehicle and current and forecasted weather conditions according to the geolocation of the vehicle and determine if the criteria for the snow camera mode is satisfied.

At operation 1108, image processing circuit 504 determines the field of view to display. The speed of the vehicle has an effect on the field of view to display, for example, if the vehicle is travelling at a high rate of speed a larger field of view may be required, to allow the driver to get a view of a greater area in all directions surrounding the vehicle. It may also be required that instead of using the captured images and video from forward facing camera 412, forward facing camera 410 may be used instead, since forward facing camera 410 is mounted in the interior of the vehicle on windshield 422 and gives the driver a better view of the road conditions ahead.

Process 1100 goes back to operation 1104 as new sensor input is received with decision circuit 508 determining if the criteria of snow mode is satisfied as new sensor input is received.

It can be appreciated that camera activation system has other camera modes associated with other drive modes such as cruise control mode. When drive mode sensor 252 detects that the vehicle is in cruise control, a cruise control camera mode can be made available to the driver with the activation of the physical or virtual camera activation button. In some embodiments, when drive mode sensor 252 detects that the vehicle is in cruise control, the cruise control camera mode is automatically displayed on one or more displayed located in the interior of the vehicle and the cruise control camera mode may have priority over other camera modes. Cruise control camera mode may include a surround view of the vehicle, or a view from front-facing cameras 264 and side-facing cameras 266.

Other camera modes can be associated with other drive modes such as autonomous or semi-autonomous drive mode. When drive mode sensor 252 detects that the vehicle is in autonomous or semi-autonomous drive mode, an autonomous or semi-autonomous drive camera mode can be made available to the driver with the activation of the physical or virtual camera activation button. In some embodiments, when drive mode sensor 252 detects that the vehicle is in autonomous or semi-autonomous drive, the autonomous or semi-autonomous drive camera mode is automatically displayed on one or more displayed located in the interior of the vehicle. Autonomous or semi-autonomous drive camera mode may include a surround view of the vehicle, or a view from front-facing cameras 264 and side-facing cameras 266, and may have priority over other camera modes.

Figure 12:
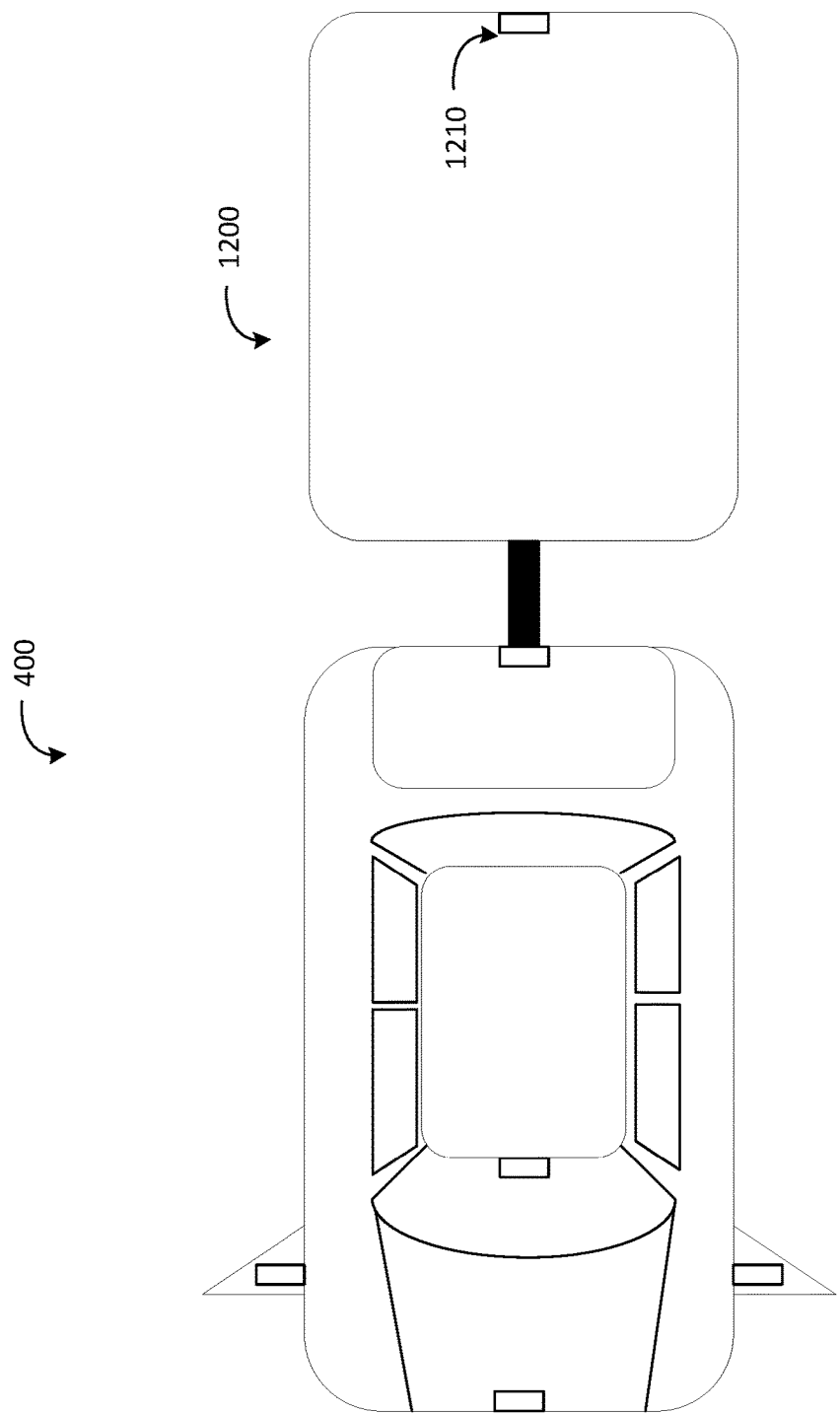
FIG. 12 illustrates a top view of an example vehicle towing a trailer, showing placement of a plurality of cameras which make up the vehicle camera activation in accordance with one embodiment of the systems and methods described herein.

FIG. 12 illustrates a top view of an example vehicle 400 towing a trailer 1200, showing placement of a plurality of cameras which make up the vehicle camera activation in accordance with one embodiment of the systems and methods described herein. Trailer 1200 may include auxiliary camera 1210 which is a rear-facing camera showing the area directly behind the trailer. When auxiliary camera 1210 is included in trailer 1200, the rear-facing camera may have priority over other camera modes, since, when a vehicle is towing a trailer, the vehicle suffers from decrease visibility of its surroundings.

Figure 13:
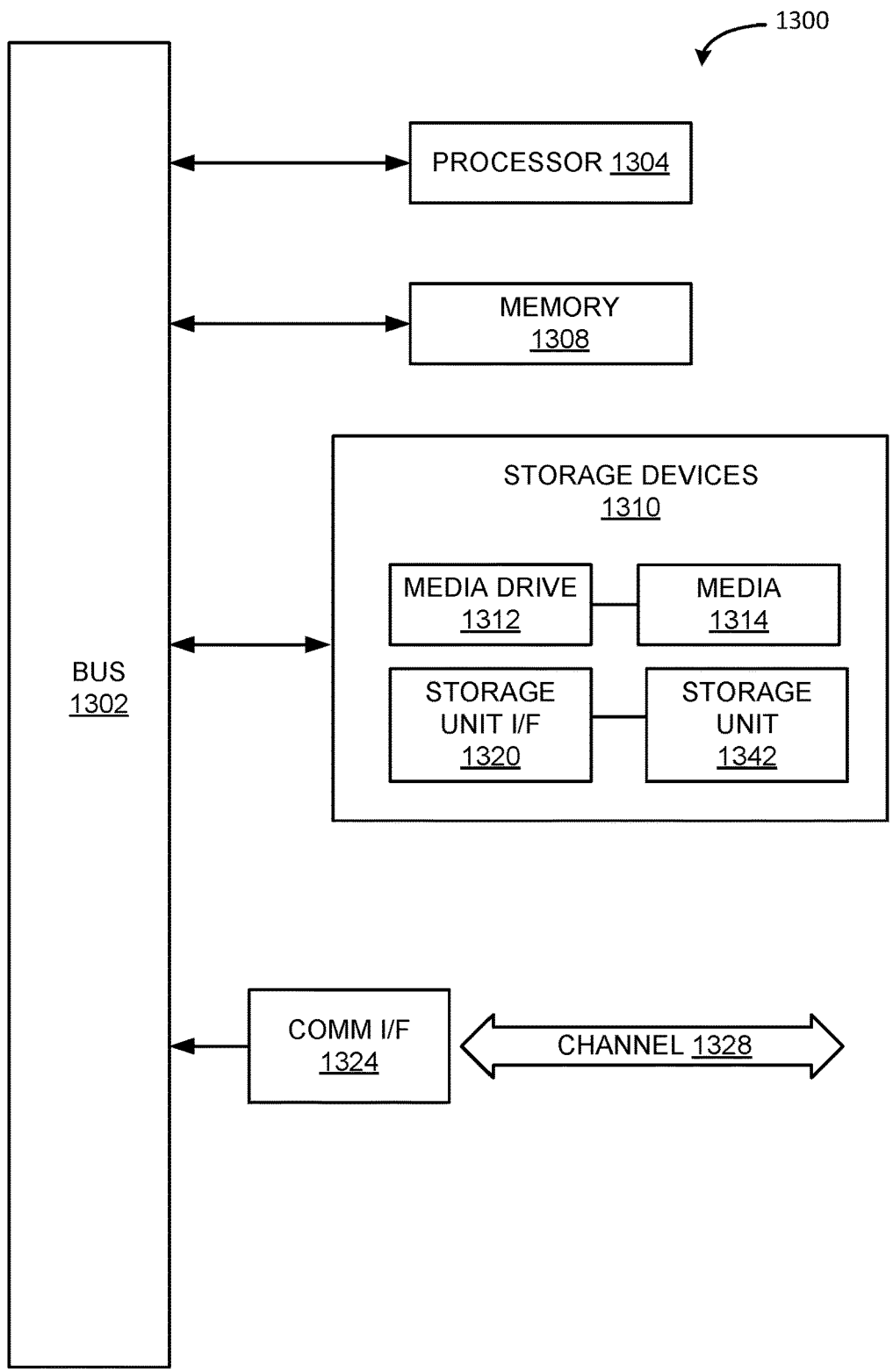
FIG. 13 illustrates an example computing system that may be used in implementing various features of embodiments of the disclosed technology.

As used herein, a circuit might be implemented utilizing any form of hardware, software, or a combination thereof. For example, one or more processors, controllers, ASICs, PLAs, PALs, CPLDs, FPGAs, logical elements, software routines or other mechanisms might be implemented to make up a circuit. In implementation, the various circuits described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

Where circuits are implemented in whole or in part using software, in one embodiment, these software elements can be implemented to operate with a computing or processing system capable of carrying out the functionality described with respect thereto. One such example computing system is shown in FIG. 13. Various embodiments are described in terms of this example-computing system 1300. After reading this description, it will become apparent to a person skilled in the relevant art how to implement the technology using other computing systems or architectures.

Referring now to FIG. 13, computing system 1300 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment, such as for example, one or more of the elements or circuits illustrated in FIGS. 1 and 2 and described herein. Computing system 1300 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 1300 might include, for example, one or more processors, controllers, control modules, or other processing devices, such as a processor 1304. Processor 1304 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 1304 is connected to a bus 1302, although any communication medium can be used to facilitate interaction with other components of computing system 1300 or to communicate externally.

Computing system 1300 might also include one or more memory modules, simply referred to herein as main memory 1308. For example, in some embodiments random access memory (RAM) or other dynamic memory, might be used for storing information and instructions to be executed by processor 1304. Main memory 1308 might also be used for storing temporary variables or other intermediate information during execution of instructions to be executed by processor 1304. Computing system 1300 might likewise include a read only memory ("ROM") or other static storage device coupled to bus 1302 for storing static information and instructions for processor 1304.

The computing system 1300 might also include one or more various forms of information storage mechanism 1310, which might include, for example, a media drive 1312 and a storage unit interface 1320. The media drive 1312 might include a drive or other mechanism to support fixed or removable storage media 1314. For example, a hard disk drive, a floppy disk drive, a magnetic tape drive, an optical disk drive, a CD or DVD drive (R or RW), a flash drive, or other removable or fixed media drive might be provided. Accordingly, storage media 1314 might include, for example, a hard disk, a floppy disk, magnetic tape, cartridge, optical disk, a CD or DVD, or other fixed or removable medium that is read by, written to or accessed by media drive 1312. As these examples illustrate, the storage media 1314 can include a computer usable storage medium having stored therein computer software or data.

In alternative embodiments, information storage mechanism 1310 might include other similar instrumentalities for allowing computer programs or other instructions or data to be loaded into computing system 1300. Such instrumentalities might include, for example, a fixed or removable storage unit 1342 and an interface 1320. Examples of such storage units 1342 and interfaces 1320 can include a program cartridge and cartridge interface, a removable memory (for example, a flash memory or other removable memory module) and memory slot, a flash drive and associated slot (for example, a USB drive), a PCMCIA slot and card, and other fixed or removable storage units 1342 and interfaces 1320 that allow software and data to be transferred from the storage unit 1342 to computing system 1300.

Computing system 1300 might also include a communications interface 1324. Communications interface 1324 might be used to allow software and data to be transferred between computing system 1300 and external devices. Examples of communications interface 1324 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 1324 might typically be carried on signals, which can be electronic, electromagnetic (which includes optical) or other signals capable of being exchanged by a given communications interface 1324. These signals might be provided to communications interface 1324 via a channel 1328. This channel 1328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1308, storage unit 1342, media 1314, and channel 1328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 1300 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "circuit," "component," or "element" does not imply that the aspects or functionality described or claimed as part of the that circuit, component, or element are all configured in a common package. Indeed, any or all of the various aspects or functionality of a circuit, component, or element, whether control logic or other aspect, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for operation of a vehicular camera and display system, the vehicular camera and display system comprising a plurality of cameras to capture images to at least one of front, rear and sides of a host vehicle and one or more displays on which to display captured images, the method comprising:

a camera mode circuit receiving input from a plurality of sensors;

the camera mode circuit determining one or more camera modes available to a camera activation system;

the camera mode circuit selecting a camera mode of the one or more camera modes available to the camera and display system using the input received from the plurality of sensors;

the camera mode circuit determining whether a detected condition corresponds to the selected camera mode and setting a time-delay amount before the camera activation system activates, wherein the amount of the time-delay is shortened or eliminated when the selected camera mode corresponds to the determined condition; and displaying images from the one or more cameras on the one or more displays of the host vehicle.

2. The method of claim 1, wherein selecting a camera mode comprises the camera mode circuit evaluating input received from the plurality of sensors to determine current conditions under which the host vehicle is operating, and selecting a camera mode of the plurality of camera modes that is appropriate for the determined current conditions.

3. The method of claim 1, further comprising the camera mode circuit displaying the images in response to an activation event.

4. The method of claim 3, wherein the activation event comprises a user activating the vehicular camera and display system by actuating an actuator or using a voice command.

5. The method of claim 3, wherein the activation event comprises the camera mode circuit automatically creating an activation event based on input received from the plurality of sensors.

6. The method of claim 1, wherein at least one of the one or more cameras is mounted to a trailer being towed by the host vehicle.

7. The method of claim 6, wherein one of the one or more camera modes comprises a tow mode, and wherein the camera mode circuit selects the tow mode when it determines based on information from one or more of the sensors that the trailer is attached to the host vehicle.

8. The method of claim 7, wherein selecting one or more cameras from which images are to be displayed based on the selected camera mode when the tow mode is the selected mode comprises selecting one or more cameras mounted to the trailer being towed by the host vehicle for display on one or more of the displays.

9. The method of claim 1, wherein one of the one or more camera modes comprises a terrain mode, and wherein the camera mode circuit selects the terrain mode when it determines based on information from one or more of the sensors that the host vehicle is operating in rough terrain.

10. The method of claim 9, wherein selecting one or more cameras from which images are to be displayed based on the selected camera mode when the terrain mode is the selected mode comprises selecting one or more side-view cameras for display on one or more of the displays.

11. The method of claim 9, wherein selecting one or more cameras from which images are to be displayed based on the selected camera mode when the terrain mode is the selected mode comprises selecting a side-view camera, a front-view camera and a rear-view camera for display, and displaying images from the side-view camera, the front-view camera and the rear-view camera simultaneously on one or more of the displays.

12. The method of claim 4, wherein the actuator comprises a button or switch and the user actuating the actuator comprises the user pressing the button or operating the switch for a predetermined period of time.

13. The method of claim 12, wherein the predetermined period of time is dependent upon a vehicle condition.

14. The method of claim 13, wherein the vehicle condition comprises a then-current speed of the host vehicle.

15. The method of claim 13, wherein the vehicle condition comprises a then-current or projected weather forecast according to a geolocation of the host vehicle.

16. The method of claim 1, wherein selecting one or more cameras from which images are to be displayed based on the selected camera mode is accomplished according to an entered preference of a vehicle user.

17. The method of claim 4, wherein the actuator comprises a button or switch and displaying images from the one or more cameras on the one or more host vehicle displays comprises displaying the images for as long as a vehicle operator maintains the button or switch in an actuated state.

18. The method of claim 17, wherein the vehicle operator actuating the actuator overrides a previous camera mode displayed on the selected host vehicle display.

19. A vehicular camera and display system, comprising:
a plurality of cameras to capture images to at least one of the front, rear and sides of a host vehicle;
a plurality of displays mounted to be visible to occupants of the host vehicle on which to display captured images to occupants of the host vehicle;
a plurality of sensors to capture conditions of the host vehicle and its surroundings; and camera mode circuit, comprising:
a communications receiver to receive input from the plurality of sensors; and
a mode circuit comprising an input to receive information from the communications receiver; wherein the mode circuit selects a camera mode of one or more camera modes available to the camera activation system using the input received from the plurality of sensors, determines whether a detected condition corresponds to the selected camera mode and setting a time-delay amount before the camera activation system activates, wherein the amount of the time-delay is shortened or eliminated when the selected camera mode corresponds to the determined condition.

20. The system of claim 19, wherein selecting a camera mode comprises the mode circuit evaluating input received from the plurality of sensors to determine current conditions under which the host vehicle is operating, and selecting a camera mode of the plurality of camera modes that is appropriate for the determined current conditions.

* * * * *